United States Patent
Mukkavilli et al.

(10) Patent No.: US 10,499,393 B2
(45) Date of Patent: *Dec. 3, 2019

(54) SELF-CONTAINED TIME DIVISION DUPLEX (TDD) SUBFRAME STRUCTURE

(71) Applicant: QUALCOMM Incorporated, San Diego, CA (US)

(72) Inventors: Krishna Kiran Mukkavilli, San Diego, CA (US); Tingfang Ji, San Diego, CA (US); Naga Bhushan, San Diego, CA (US); Joseph Binamira Soriaga, San Diego, CA (US); John Edward Smee, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,914

(22) Filed: Dec. 29, 2017

(65) Prior Publication Data

US 2018/0124783 A1 May 3, 2018

Related U.S. Application Data

(63) Continuation of application No. 14/940,546, filed on Nov. 13, 2015.

(Continued)

(51) Int. Cl.
*H04J 3/00* (2006.01)
*H04W 72/04* (2009.01)
(Continued)

(52) U.S. Cl.
CPC ....... *H04W 72/0446* (2013.01); *H04L 1/1812* (2013.01); *H04L 1/1861* (2013.01);
(Continued)

(58) Field of Classification Search
CPC ......... H04W 72/0446; H04W 72/1278; H04W 72/042; H04L 5/14; H04L 1/1812; H04L 5/0055
(Continued)

(56) References Cited

U.S. PATENT DOCUMENTS

| | | | |
|---|---|---|---|
| 7,515,579 B2 | 4/2009 | Cheng et al. | |
| 8,363,597 B2 | 1/2013 | Abraham et al. | |

(Continued)

FOREIGN PATENT DOCUMENTS

| | | | |
|---|---|---|---|
| CN | 102404841 A | 4/2012 | |
| CN | 103716143 A | 4/2014 | |

(Continued)

OTHER PUBLICATIONS

Eeva L., et al., "On the TDD Subframe Structure for Beyond 4G Radio Access Network", Jul. 3, 2013 (From Applicants IDS filed on Nov. 22, 2017) (Year: 2013).*

(Continued)

*Primary Examiner* — Mang Hang Yeung
(74) *Attorney, Agent, or Firm* — Qualcomm IP Dept.; James Hunt Yancey, Jr.

(57) ABSTRACT

Aspects of the present disclosure provide a subframe structure for time division duplex (TDD) carriers that can be entirely self-contained. That is, information transmitted on a TDD carrier may be grouped into subframes, where each subframe provides communication in both directions (e.g., uplink and downlink) in a suitable fashion to enable such communication without needing any further information in another subframe. For example, a single subframe may include scheduling information, data information corresponding to the scheduling information, and acknowledgment information corresponding to the data information.

50 Claims, 11 Drawing Sheets

Related U.S. Application Data

(60) Provisional application No. 62/133,386, filed on Mar. 15, 2015.

(51) Int. Cl.
  *H04L 5/14* (2006.01)
  *H04W 72/12* (2009.01)
  *H04L 1/18* (2006.01)
  *H04L 5/00* (2006.01)

(52) U.S. Cl.
  CPC .......... *H04L 1/1887* (2013.01); *H04L 5/0055* (2013.01); *H04L 5/0082* (2013.01); *H04L 5/0091* (2013.01); *H04L 5/14* (2013.01); *H04L 5/1469* (2013.01); *H04W 72/042* (2013.01); *H04W 72/1278* (2013.01); *H04L 5/0026* (2013.01); *H04L 5/0044* (2013.01)

(58) Field of Classification Search
  USPC ....................................................... 370/280
  See application file for complete search history.

(56) References Cited

U.S. PATENT DOCUMENTS

| | | | |
|---|---|---|---|
| 8,472,465 B2 | 6/2013 | Suo et al. | |
| 8,599,702 B2* | 12/2013 | Kim | H04B 7/2656 370/242 |
| 8,614,977 B2 | 12/2013 | Wu et al. | |
| 8,700,023 B2 | 4/2014 | Nan et al. | |
| 8,724,636 B2 | 5/2014 | Chen et al. | |
| 8,756,477 B2 | 6/2014 | Challa et al. | |
| 8,787,344 B2 | 7/2014 | Malladi et al. | |
| 8,848,620 B2 | 9/2014 | Fan et al. | |
| 8,948,064 B2 | 2/2015 | Shahar | |
| 9,398,575 B2 | 7/2016 | Clevorn | |
| 9,814,058 B2 | 11/2017 | Jiang et al. | |
| 9,930,687 B2 | 3/2018 | Mizusawa et al. | |
| 9,955,460 B2 | 4/2018 | Tavildar et al. | |
| 10,075,970 B2 | 9/2018 | Jiang et al. | |
| 10,123,219 B2 | 11/2018 | Bhushan et al. | |
| 2003/0108013 A1 | 6/2003 | Hwang et al. | |
| 2008/0070586 A1 | 3/2008 | Kermoal et al. | |
| 2008/0080476 A1 | 4/2008 | Cho et al. | |
| 2008/0220791 A1* | 9/2008 | Cho | H04W 72/042 455/450 |
| 2009/0040999 A1* | 2/2009 | Yuk | H04L 1/0081 370/345 |
| 2009/0137230 A1 | 5/2009 | Miyoshi et al. | |
| 2009/0141690 A1 | 6/2009 | Fan et al. | |
| 2009/0161591 A1* | 6/2009 | Ahmadi | H04L 5/14 370/312 |
| 2009/0161649 A1 | 6/2009 | Ponnathota et al. | |
| 2009/0201838 A1 | 8/2009 | Zhang et al. | |
| 2009/0213769 A1* | 8/2009 | Shen | H04W 72/14 370/280 |
| 2009/0323666 A1 | 12/2009 | Malladi et al. | |
| 2010/0118730 A1 | 5/2010 | Tanaka et al. | |
| 2010/0275086 A1* | 10/2010 | Bergquist | H04L 1/1812 714/748 |
| 2012/0057547 A1 | 3/2012 | Loehr et al. | |
| 2012/0135773 A1 | 5/2012 | Shen et al. | |
| 2012/0287882 A1 | 11/2012 | Kim et al. | |
| 2013/0028205 A1* | 1/2013 | Damnjanovic | H04L 5/001 370/329 |
| 2013/0039193 A1 | 2/2013 | Yin et al. | |
| 2013/0039231 A1 | 2/2013 | Wang | |
| 2013/0083736 A1 | 4/2013 | Yin et al. | |
| 2013/0083740 A1 | 4/2013 | Eriksson et al. | |
| 2013/0121186 A1 | 5/2013 | Vajapeyam et al. | |
| 2013/0128781 A1* | 5/2013 | Li | H04W 72/0446 370/280 |
| 2013/0194980 A1 | 8/2013 | Yin et al. | |
| 2013/0242904 A1 | 9/2013 | Sartori et al. | |
| 2013/0301486 A1 | 11/2013 | Kishiyama et al. | |
| 2013/0343239 A1 | 12/2013 | Damnjanovic et al. | |
| 2014/0036740 A1 | 2/2014 | Lee et al. | |
| 2014/0050192 A1* | 2/2014 | Kim | H04L 5/001 370/329 |
| 2014/0071954 A1 | 3/2014 | Au et al. | |
| 2014/0133369 A1 | 5/2014 | Cheng et al. | |
| 2014/0153450 A1 | 6/2014 | Jang et al. | |
| 2014/0204783 A1 | 7/2014 | Lin et al. | |
| 2014/0204807 A1 | 7/2014 | Li et al. | |
| 2014/0241225 A1 | 8/2014 | Novak et al. | |
| 2014/0342745 A1 | 11/2014 | Bhushan et al. | |
| 2015/0036561 A1 | 2/2015 | Wang et al. | |
| 2015/0085834 A1 | 3/2015 | Liu et al. | |
| 2015/0092566 A1 | 4/2015 | Balachandran et al. | |
| 2015/0103702 A1 | 4/2015 | Lahetkangas et al. | |
| 2015/0109972 A1 | 4/2015 | Khoryaev et al. | |
| 2015/0180619 A1 | 6/2015 | Majjigi et al. | |
| 2015/0181612 A1 | 6/2015 | Gan et al. | |
| 2015/0188650 A1 | 7/2015 | Au et al. | |
| 2015/0264662 A1 | 9/2015 | Sahlin et al. | |
| 2015/0326291 A1 | 11/2015 | Wong et al. | |
| 2015/0358918 A1 | 12/2015 | Gao et al. | |
| 2016/0142292 A1 | 5/2016 | Au et al. | |
| 2016/0192396 A1 | 6/2016 | Ng et al. | |
| 2016/0205683 A1 | 7/2016 | Quan et al. | |
| 2016/0212734 A1 | 7/2016 | He et al. | |
| 2016/0233904 A1 | 8/2016 | Wu et al. | |
| 2016/0234834 A1 | 8/2016 | Aboul-Magd et al. | |
| 2016/0249329 A1 | 8/2016 | Au et al. | |
| 2016/0270070 A1 | 9/2016 | Mukkavilli et al. | |
| 2016/0270115 A1 | 9/2016 | Mukkavilli et al. | |
| 2016/0315741 A1* | 10/2016 | Tsai | H04L 5/0007 |
| 2016/0323852 A1 | 11/2016 | Golitschek Edler Von Elbwart et al. | |
| 2016/0330737 A1 | 11/2016 | Takeda et al. | |
| 2016/0366704 A1 | 12/2016 | Lee et al. | |
| 2017/0013610 A1 | 1/2017 | Lee et al. | |
| 2017/0019905 A1 | 1/2017 | Ko et al. | |
| 2017/0019930 A1 | 1/2017 | Lee et al. | |
| 2017/0118743 A1 | 4/2017 | Kim et al. | |
| 2017/0150367 A1 | 5/2017 | Han et al. | |
| 2017/0150424 A1 | 5/2017 | Lee et al. | |
| 2017/0215188 A1 | 7/2017 | Kim et al. | |
| 2017/0215201 A1 | 7/2017 | Kim et al. | |
| 2017/0257878 A1 | 9/2017 | Kazmi et al. | |
| 2017/0303144 A1 | 10/2017 | Guo et al. | |
| 2018/0006743 A1 | 1/2018 | Zhu et al. | |
| 2018/0042035 A1 | 2/2018 | Jiang et al. | |
| 2018/0098348 A1 | 4/2018 | Mukkavilli et al. | |
| 2019/0007956 A1 | 1/2019 | Jiang et al. | |

FOREIGN PATENT DOCUMENTS

| | | |
|---|---|---|
| CN | 103840931 A | 6/2014 |
| CN | 104348582 A | 2/2015 |
| EP | 2836044 A1 | 2/2015 |
| JP | 2012175258 A | 9/2012 |
| JP | 2014500685 A | 1/2014 |
| KR | 20140073534 A | 6/2014 |
| TW | 1456936 B | 10/2014 |
| TW | 201446052 A | 12/2014 |
| TW | 201507415 A | 2/2015 |
| WO | 2008028006 A2 | 3/2008 |
| WO | 2009022391 A1 | 2/2009 |
| WO | 2009100069 | 8/2009 |
| WO | 2009124079 A1 | 10/2009 |
| WO | 2010118371 A1 | 10/2010 |
| WO | 2012068141 A1 | 5/2012 |
| WO | 2013110228 A1 | 8/2013 |
| WO | 2013176597 A1 | 11/2013 |
| WO | 2014067140 A1 | 5/2014 |
| WO | 2014179964 A1 | 11/2014 |

OTHER PUBLICATIONS

3GPP 36.211, "3rd Generation Partnership Project, Technical Specification Group Radio Access Network, Evolved Universal Terres-

(56) References Cited

OTHER PUBLICATIONS trial Radio Access (E-UTRA), Physical Channels and Modulation (Release 8)", 3GPP Standard, 3GPP TS 36.211 V8.5.0, Dec. 1, 2008 (Dec. 1, 2008), pp. 1-82, XP050377537.

"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre ; 650 , Route Des Lucioles ; F-06921 Sophia-Antipolis Cedex; France, vol. RAN WG1, No. V12.4.0, Jan. 3, 2015 (Jan. 3, 2015), pp. 1-124, XP050927386, [retrieved on Jan. 3, 2015] chapter 1 "scope" chapter 4 "Frame structure".

Eeva L., et al., "On the TDD Subframe Structure for Beyond 4G Radio Access Network", 2013 Future Network & Mobile Summit, Authors, Jul. 3, 2013 (Jul. 3, 2013), pp. 1-10.

International Search Report and Written Opinion—PCT/US2016/019942—ISA/EPO—dated May 20, 2016.

Tiedemann E., et al., "5G: The Next Generation (Big Wave) of Wireless," Jul. 22, 2015 (Jul. 22, 2015), XP055280307, Retrieved from the Internet URL:https://www.nttdocomo.co.jp/binary/pdf/corporate/technology/rd/tech/5g/NTTDOCOMO 5G TBS lecture6.pdf.

Co-pending U.S. Appl. No. 15/857,543, filed Dec. 28, 2017.
Co-pending U.S. Appl. No. 15/857,571, filed Dec. 28, 2017.

"Chapter 12: Retransmission Protocols" In: Erik Dahlman: "4G LTE/LTE-Advanced for Mobile Broadband", Nov. 30, 2013 (Nov. 30, 2013), Academic Press, XP002758475, pp. 299-319, Sections 12.1, 12.1.3.2.

Eeva L., et al., "Achieving Low Latency and Energy Consumption by 5G TDD Mode Optimization," 2014 IEEE International Conference on Communications Workshops (ICC), IEEE, Jun. 10, 2014 (Jun. 10, 2014), pp. 1-6, XP032630839, DOI: 10.1109/ICCW.2014.6881163 [retrieved on Aug. 20, 2014].

Levanen T., et al., "Radio Interface Design for Ultra-Low Latency Millimeter-Wave Communications in 5G Era", IEEE Globecom Workshops, Dec. 8-12, 2014, pp. 1420-1426.

Lu Y., et al., "Uplink Control for Low Latency HARQ in TDD Carrier Aggregation", Vehicular Technology Conference (VTC Spring), 2012 IEEE 75th, IEEE, May 6, 2012 (May 6, 2012), pp. 1-5, XP032202607, DOI: 10.1109/VETECS.2012.6240190, ISBN: 978-1-4673-0989-9, abstract Section I; p. 1.

Mediatek Inc: "Discussions on UL HARQ for Rel-13 MTC UE", 3GPP Draft, R1-150675 Discussions on UL HARQ for Rel-13 MTC UE, 3rd Generation Partnership Project (3GPP), Mobile Competence Centre, 650, Route Des Lucioles, F-06921 Sophia-Antipolis Cedex, France, vol. RAN WG1, no. Athens, Greece, Feb. 9, 2015-Feb. 13, 2015 Feb. 8, 2015 (Feb. 8, 2015), pp. 1-5, XP050933875, Retrieved from the Internet: URL:http://www.3gpp.org/ftp/Meetings_3GPP_SYNC/RAN1/Docs/ [retrieved on Feb. 8, 2015] Section 2.

Levanen T.A., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415.

Pedersen K., et al., "A Flexible Frame Structure for 5G Wide Area", 2015 IEEE 82nd Vehicular Technology Conference (VTC 2015—Fall), Sep. 6, 2015, pp. 1-5, XP032856972, DOI: 10.1109/VTCFALL.2015.7390791 [retrieved on Jan. 25, 2016], 5 pages.

Popovski P., et al., "Deliverable D2.3 Components of a new air interface-building blocks and performance," Mobile and wireless communications Enablers for the Twenty-twenty Information Society, ICT—317669-METIS/D2.3, 2014, pp. 117.

Popovski P., et al., "Deliverable D2.4 Proposed solutions for new radio access," Mobile and wireless communications-Enablers for the Twenty-twenty Information Society, IICT—317669—M ETIS/D2.4, 2015, pp. 190.

Qualcomm Technologies Inc: "The 5G Unified Air Interface Scalable to an Extreme Variation of Requirement", Nov. 2015, 46 pages.

Smee J.E, "5G Design Across Services," May 12, 2015 (May 12, 2015), XP055299081, Retrieved from the Internet: URL:https://johannesbergsummit.com/wp-content/uploads/sites/6/2014/11/Tuesday_3_John -Smee.pdf [retrieved on Aug. 31, 2016].

Soret B., et al., "Fundamental Tradeoffs among Reliability, Latency and Throughput in Cellular Networks," IEEE Proceedings of Globecom, Dec. 2014, pp. 1391-1396.

Toni L., et al., "Dense Small-Cell Networks: Rethinking the Radio Interface Beyond LTE-Advanced", 1st International Conference on 5G for Ubiquitous Connectivity, ICST, Nov. 26, 2014 (Nov. 26, 2014), pp. 163-169, XP032735039, DOI: 10.4108/ICST.5GU.2014.258115 [retrieved on Feb. 11, 2015].

Toni L., et al., "Low latency radio interface for 5G flexible TDD local area conmunications", 2014 IEEE International conference on Communications Workshops (ICC), IEEE, Jun. 10, 2014 (Jun. 10, 2014), pp. 7-13, XP032630785, DOI: 10.1109/ICCW.2014.6881164 [retrieved on Aug. 20, 2014] the whole document.

ZTE: "Issues About Data Transmission in TDD-eIMTA", 3GPP Draft, R1-132108 Issues About Data Transmission in TDD-eIMTA, 3rd Generation Partnership Project (3GPP), Mobile Competence Centre, 650, Route Des Lucioles, F-06921 Sophia-Antipolis Cedex, France, vol. RAN WG1, no. Fukuoka, Japan, May 20, 2013-May 24, 2013 May 11, 2013 (May 11, 2013), pp. 1-4, XP050697886, Retrieved from the Internet: URL: http://www.3gpp.org/ftp/tsg_ran/WG1_RL1/TSGR1_73/Docs/ [retrieved on May 11, 2013] the whole document.

Taiwan Search Report—TW105105682—TIPO—dated Aug. 15, 2019.

CNIPA Office Action dated Sep. 25, 2019 for Chinese Counterpart Application No. 201680015457.7 (for Self-contained time division duplex (TDD) subframe structure for wireless communications).

\* cited by examiner

SELF-CONTAINED TIME DIVISION DUPLEX (TDD) SUBFRAME STRUCTURE

PRIORITY CLAIM

The present application for patent is a Continuation of Non-Provisional application Ser. No. 14/940,546 filed in the U.S. Patent and Trademark Office on Nov. 13, 2015, the entire content of which is incorporated herein by reference as if fully set forth below in its entirety and for all applicable purposes. Non-Provisional application Ser. No. 14/940,546 claims priority to Provisional Application No. 62/133,386 filed in the U.S. Patent and Trademark Office on Mar. 15, 2015, the entire content of which is incorporated herein by reference as if fully set forth below in its entirety and for all applicable purposes.

TECHNICAL FIELD

Aspects of the present disclosure relate generally to wireless communication systems, and more particularly, to a self-contained subframe structure for wireless communication utilizing a time division duplex (TDD) carrier.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

The spectrum allocated to such wireless communication networks can include licensed and/or unlicensed spectrum. Licensed spectrum is generally restricted in its use for wireless communication except for licensed use as regulated by a governmental body or other authority within a given region. Unlicensed spectrum is generally free to use, within limits, without the purchase or use of such a license. As the use of wireless communication systems continues to increase, the demand for reallocation of additional spectrum has also increased in many different use cases, including but not limited to telephones, smart phones, PCs, smart meters, remote sensors, smart alarms, mesh nodes, etc.

In many cases, this spectrum is being (or is expected to be) allocated in such a way that paired carriers, utilized in many existing frequency division duplex (FDD) systems, are either not available, or not available in matched bandwidth configurations. Accordingly, time division duplex (TDD) carriers are expected to be utilized in many future deployments for wireless communication systems.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide subframe structures for time division duplex (TDD) carriers that can be entirely self-contained. That is, information transmitted on a TDD carrier may be grouped into subframes, where each subframe provides communication in both directions (e.g., uplink from a subordinate entity to a scheduling entity, and downlink from the scheduling entity to the subordinate entity) in a suitable fashion to enable communication of a set of packets between the scheduling entity and the subordinate entity. For example, a single subframe may include scheduling information, data information corresponding to the scheduling information, and acknowledgment information corresponding to the data information.

In one aspect, a method of wireless communication in a synchronous network is provided for a subordinate entity to communicate with a scheduling entity utilizing a time division duplex (TDD) carrier, where the TDD carrier includes a plurality of subframes. The method includes utilizing a subframe structure for each of the plurality of subframes, the subframe structure including a control portion, a data portion, and an acknowledgement portion. The method further includes receiving scheduling information in the control portion of a subframe of the plurality of subframes, receiving data information corresponding to the scheduling information in the data portion of the subframe, and transmitting acknowledgement information corresponding to the data information in the acknowledgement portion of the subframe, where the control portion, the data portion, and the acknowledgement portion are contained in the same subframe.

Another aspect of the disclosure provides a method of wireless communication in a synchronous network is provided for a subordinate entity to communicate with a scheduling entity utilizing a time division duplex (TDD) carrier, where the TDD carrier includes a plurality of subframes. The method includes utilizing a subframe structure for each of the plurality of subframes, the subframe structure including a control portion, a data portion, and an acknowledgement portion. The method further includes. The method further includes receiving scheduling information in the control portion of a subframe of the plurality of subframes, transmitting data information corresponding to the scheduling information in the data portion of the subframe, and receiving acknowledgement information corresponding to the data information in the acknowledgement portion of the subframe, where the control portion, the data portion, and the acknowledgement portion are contained in the same subframe.

Another aspect of the disclosure provides a subordinate entity configured to wirelessly communicate with a scheduling entity in a synchronous network. The subordinate entity includes a processor, a wireless transceiver communicatively coupled to the processor, and a memory communicatively coupled to the processor. The processor is configured to utilize a subframe structure for each of a plurality of subframes within a time division duplex (TDD) carrier, the subframe structure including a control portion, a data portion, and an acknowledgement portion. The processor is further configured to receive scheduling information in the control portion of a subframe of the plurality of subframes via the wireless transceiver, receive data information corresponding to the scheduling information in the data portion of the subframe via the wireless transceiver, and transmit acknowledgement information corresponding to the data information in the acknowledgement portion of the subframe via the transceiver, where the control portion, the data portion, and the acknowledgement portion are contained in the same subframe.

Another aspect of the disclosure provides a subordinate entity configured to wirelessly communicate with a scheduling entity in a synchronous network. The subordinate entity includes a processor, a wireless transceiver communicatively coupled to the processor, and a memory communicatively coupled to the processor. The processor is configured to utilize a subframe structure for each of a plurality of subframes within a time division duplex (TDD) carrier, the subframe structure including a control portion, a data portion, and an acknowledgement portion. The processor is further configured to receive scheduling information in the control portion of a subframe of the plurality of subframes via the wireless transceiver, transmit data information corresponding to the scheduling information in the data portion of the subframe via the wireless transceiver, and receive acknowledgement information corresponding to the data information in the acknowledgement portion of the subframe via the wireless transceiver, where the control portion, the data portion, and the acknowledgement portion are contained in the same subframe.

Another aspect of the disclosure provides a subordinate entity apparatus configured to wirelessly communicate with a scheduling entity in a synchronous network. The subordinate entity apparatus includes means for utilizing a subframe structure for each of a plurality of subframes within a time division duplex (TDD) carrier, the subframe structure including a control portion, a data portion, and an acknowledgement portion. The subordinate entity apparatus further includes means for receiving scheduling information in the control portion of a subframe of the plurality of subframes, means for receiving data information corresponding to the scheduling information in the data portion of the subframe, and means for transmitting acknowledgement information corresponding to the data information in the acknowledgement portion of the subframe, where the control portion, the data portion, and the acknowledgement portion are contained in the same subframe.

Another aspect of the disclosure provides a subordinate entity apparatus configured to wirelessly communicate with a scheduling entity in a synchronous network. The subordinate entity apparatus includes means for utilizing a subframe structure for each of a plurality of subframes within a time division duplex (TDD) carrier, the subframe structure including a control portion, a data portion, and an acknowledgement portion. The subordinate entity apparatus further includes means for receiving scheduling information in the control portion of a subframe of the plurality of subframes, means for transmitting data information corresponding to the scheduling information in the data portion of the subframe, and means for receiving acknowledgement information corresponding to the data information in the acknowledgement portion of the subframe, where the control portion, the data portion, and the acknowledgement portion are contained in the same subframe.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
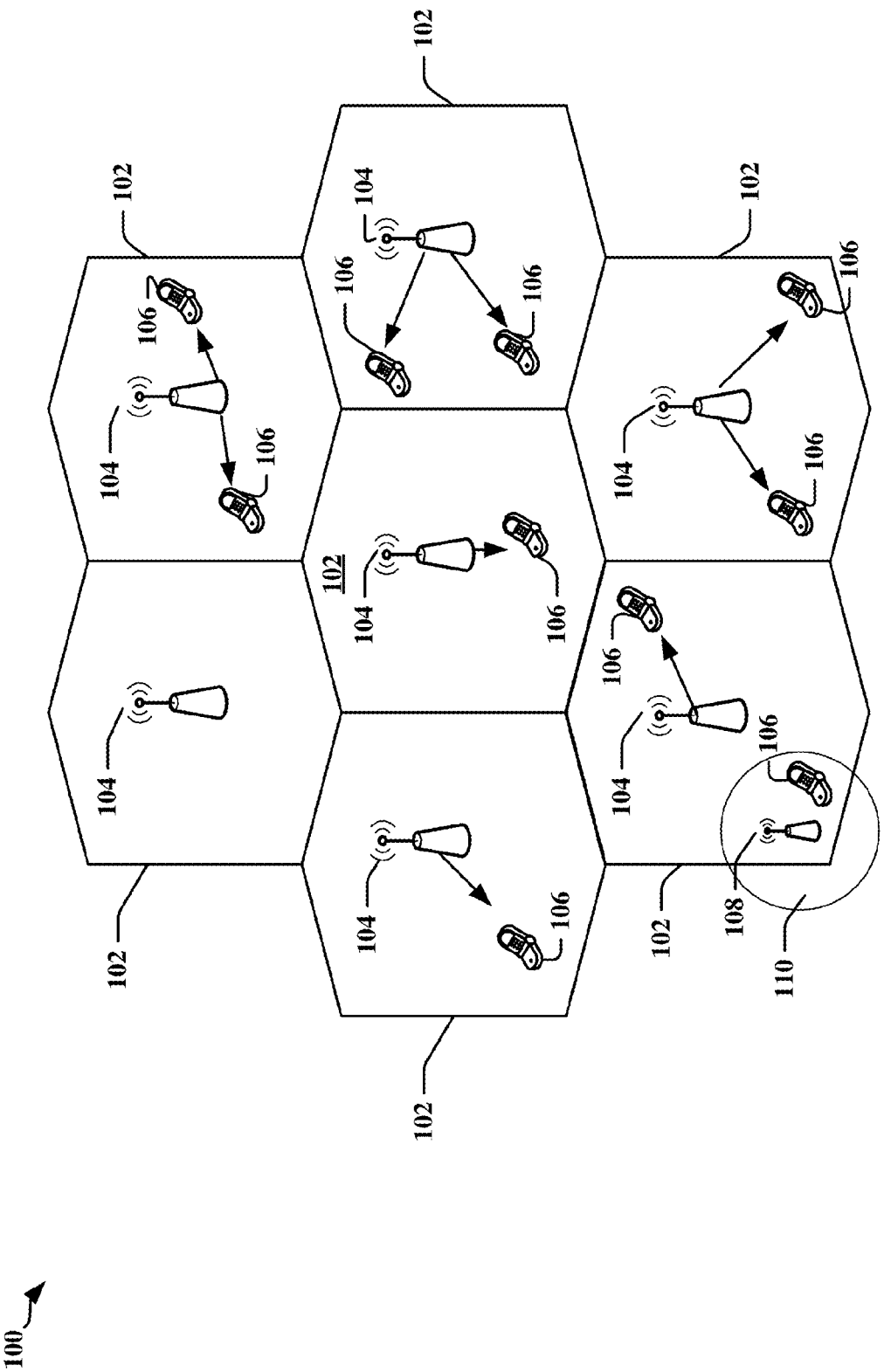
FIG. 1 is a diagram illustrating an example of a network architecture.

The various concepts presented throughout this disclosure may be implemented across a broad variety of telecommunication systems, network architectures, and communication standards. In order to illustrate some of the entities or devices described throughout the present disclosure, FIG. 1 is a diagram illustrating a generalized example of a network 100. In this example, the network 100 is divided into a number of cellular regions 102/110. In the context of a multiple access network, channel resources may generally be scheduled, and each entity may be synchronous. That is, each node utilizing the network may coordinate its usage of the resources such that transmissions are only made during the allocated portion of the frame, and the time of each allocated portion is synchronized among the different nodes. One node in each cellular region 102/110 acts as a scheduling entity.

Each scheduling entity 104/108 may be a base station or access point, or a user equipment (UE) 106 in a device-to-device (D2D) and/or mesh network. The scheduling entity 104/108 manages the resources on the carrier and assigns resources to other users of the channel, including subordinate entities, such as one or more UEs 106 in the cellular network 100. The scheduling entities 104 are responsible for all radio related functions including radio bearer control, admission control, mobility control, scheduling, security, and connectivity to a centralized controller and/or gateway. There is no centralized controller in this example of a network 100, but a centralized controller may be used in alternative configurations.

One or more lower power class scheduling entities 108 may have a cellular region 110 that overlaps with one or more other cellular regions (cells) 102. The lower power class scheduling entity 108 may be a femto cell (e.g., home scheduling entity), pico cell, micro cell, remote radio head, or in some instances, another UE 106. The macro scheduling entities 104 are each assigned to a respective cell 102 and are configured to provide an access point to a core network for all the UEs 106 in the cells 102.

The modulation and multiple access scheme employed by the network 100 may vary depending on the particular telecommunications standard being deployed. In some radio access networks, such as those defined in LTE standards, orthogonal frequency division multiplexing (OFDM) is used on the downlink (DL) and single carrier frequency division multiple access (SC-FDMA) is used on the uplink (UL) to support both frequency division duplexing (FDD) and TDD. As those skilled in the art will readily appreciate from the detailed description to follow, the various concepts presented herein are well suited for various applications including telecommunication standards employing other modulation and multiple access techniques. By way of example, these concepts may be employed in 5G, LTE, or Evolution-Data Optimized (EV-DO). EV-DO is an air interface standard promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 is described in documents from the 3GPP2 organization. The actual wireless communication standard and the multiple access technology employed will depend on the specific application and the overall design constraints imposed on the system.

The scheduling entities 104 may have multiple antennas supporting MIMO technology. The use of MIMO technology enables the scheduling entities 104 to exploit the spatial domain to support spatial multiplexing, beamforming, and transmit diversity. Spatial multiplexing may be used to transmit different streams of data simultaneously on the same frequency. The data steams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the downlink (DL). The spatially precoded data streams arrive at the UE(s) 106 with different spatial signatures, which enables each of the UE(s) 106 to recover the one or more data streams destined for that UE 106. On the uplink (UL), each UE 106 transmits a spatially precoded data stream, which enables the scheduling entity 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Certain aspects of an access network described herein may relate to a system supporting OFDM on the DL. OFDM is a spread-spectrum technique that modulates data over a number of subcarriers within an OFDM symbol. The subcarriers are spaced apart at precise frequencies. The spacing provides orthogonality that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a Discrete Fourier Transform (DFT)-spread OFDM signal to compensate for high peak-to-average power ratio (PAPR).

Figure 2:
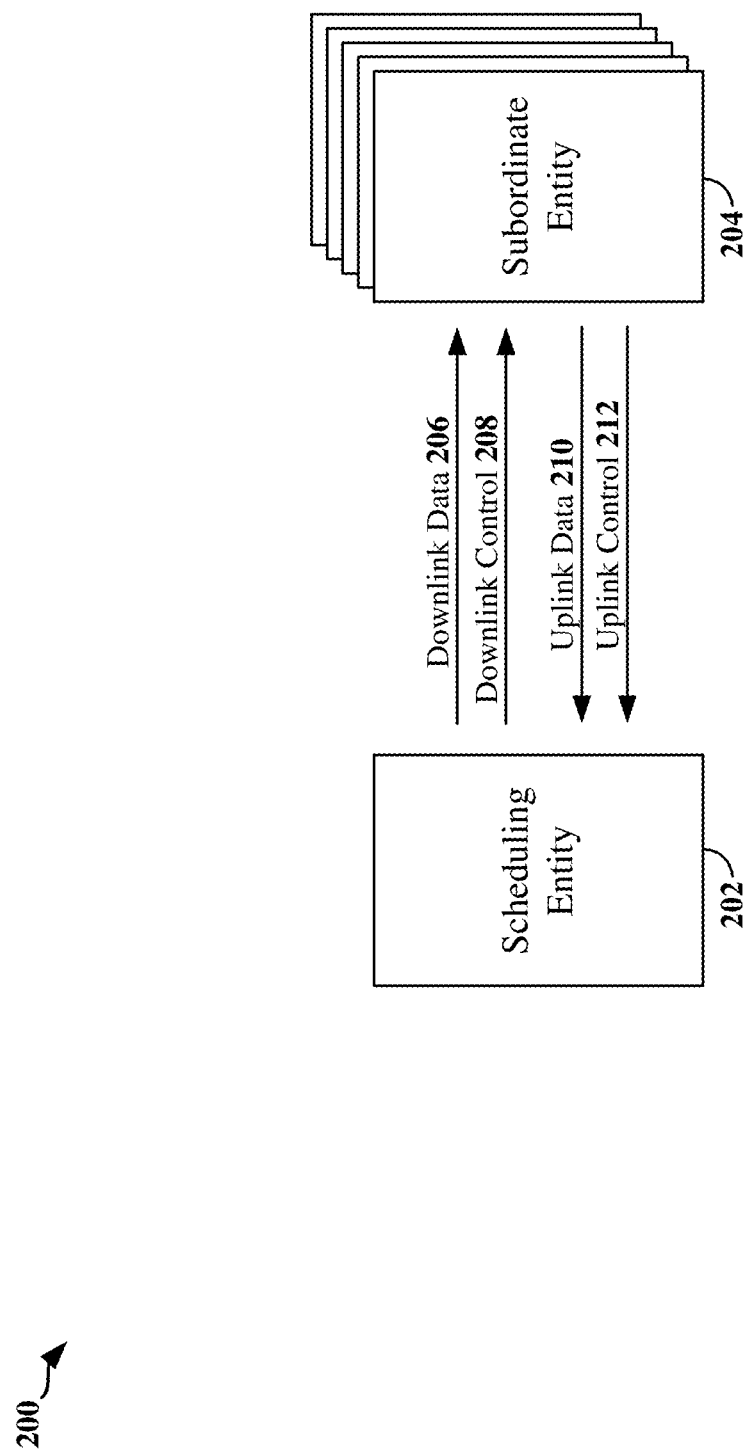
FIG. 2 is a block diagram conceptually illustrating an example of a scheduling entity communicating with one or more subordinate entities according to some embodiments.

Referring now to FIG. 2, a block diagram illustrates an exemplary scheduling entity 202 in wireless communication with a plurality of subordinate entities 204. The scheduling entity 202 transmits downlink data channel(s) 206 and downlink control channel(s) 208, while the subordinate entities 204 transmit uplink data channel(s) 210 and uplink control channel(s) 212. Of course, the channels illustrated in FIG. 1 are not necessarily all of the channels that may be utilized between a scheduling entity 202 and subordinate entities 204, and those of ordinary skill in the art will recognize that other channels may be utilized in addition to those illustrated, such as other data, control, and feedback channels.

In accordance with aspects of the present disclosure, the term downlink (DL) may refer to a point-to-multipoint transmission originating at the scheduling entity 202. In addition, the term uplink (UL) may refer to a point-to-point transmission originating at a subordinate entity 204.

Broadly, the scheduling entity 202 is a node or device responsible for scheduling traffic in a wireless communication network, including the downlink transmissions and, in some examples, uplink data 210 from one or more subordinate entities 204 to the scheduling entity 202. A scheduling entity 102 may be, or may reside within, a base station, a network node, a user equipment (UE), an access terminal, or any suitable node or peer in a wireless communication network.

Broadly, the subordinate entity 204 is a node or device that receives scheduling control information, including but not limited to scheduling grants, synchronization or timing information, or other control information from another entity in the wireless communication network such as the scheduling entity 202. A subordinate entity may be, or may reside within, a base station, a network node, a UE, an access terminal, or any suitable node or peer in a wireless communication network.

As illustrated in FIG. 2, the scheduling entity 202 may transmit downlink data 206 to one or more subordinate entities 204. In addition, the subordinate entities 204 may transmit uplink data 210 to the scheduling entity 202. In accordance with aspects of the disclosure, the uplink data 210 and/or downlink data 206 may be transmitted in transmission time intervals (TTIs). As used herein, the term TTI refers to the period in which a block of data, corresponding to the smallest collection of symbols to be processed at the Media Access Control (MAC) layer and above, is transferred by the physical layer onto the radio interface. In accordance with aspects of the disclosure, a TTI is equal to the duration of a subframe. Thus, as further used herein, the term subframe refers to an encapsulated set of information sent within a single TTI that is capable of being independently decoded. In various aspects, multiple subframes are grouped together to form a single frame. For example, in LTE, the TTI (subframe duration) is set to 1 ms, whereas the frame duration is set to 10 ms, corresponding to 10 subframes. However, within the scope of the present disclosure, a subframe may have a duration of 250 µs, 1 ms, or any suitable duration. Similarly, any suitable number of subframes may occupy a frame. Frames are generally utilized by upper Open Systems Interconnection (OSI) layers for synchronization and other purposes.

In an aspect, the scheduling entity 202 may multiplex downlink data for a set of subordinate entities (i.e., two or more subordinate entities) within a single subframe. For example, the scheduling entity 202 may multiplex downlink data to the set of subordinate entities using time division multiplexing, frequency division multiplexing (e.g., OFDM), code division multiplexing, and/or any suitable multiplexing scheme known to those of ordinary skill in the art. Likewise, any suitable multiple access scheme may be utilized to combine uplink data from multiple subordinate entities 204 within a single subframe.

The scheduling entity 202 may further broadcast downlink control channel(s) 208 to one or more subordinate entities 204. The downlink control channel(s) 208 may include in some examples a physical downlink control channel (PDCCH), a physical downlink shared channel (PDSCH) and/or any other control channels or pilots, such as the Channel State Information-Reference Signal (CSI-RS) pilot. In still a further example, the downlink control channel(s) 208 may include acknowledgement information (e.g., acknowledged (ACK)/not acknowledged (NACK) packets) indicating whether the uplink data 210 in one or more subframes was received correctly at the scheduling entity 202. For example, a data packet may include verification bits, such as a checksum and/or a cyclic redundancy check (CRC). Accordingly, a device receiving the data packet may receive and decode a data packet and verify the integrity of the received and decoded packet in accordance with the verification bits. When the verification succeeds, a positive acknowledgment (ACK) may be transmitted; whereas when the verification fails, a negative acknowledgment (NACK) may be transmitted.

Furthermore, each of the subordinate entities 204 may transmit uplink control channel(s) 212 to the scheduling entity 202. The uplink control channel(s) 212 may include in some examples a physical uplink control channel (PUCCH), random access channel (RACH), scheduling request (SR), sounding reference signal (SRS), channel quality indicator (CQI), channel state feedback information, buffer status information, or any other suitable control information or signaling. In still a further example, the uplink control channel(s) 212 may include acknowledgement information (e.g., acknowledged (ACK)/not acknowledged (NACK) packets) indicating whether the downlink data 206 in one or more subframes was received correctly at the subordinate entity 204.

Figure 3:
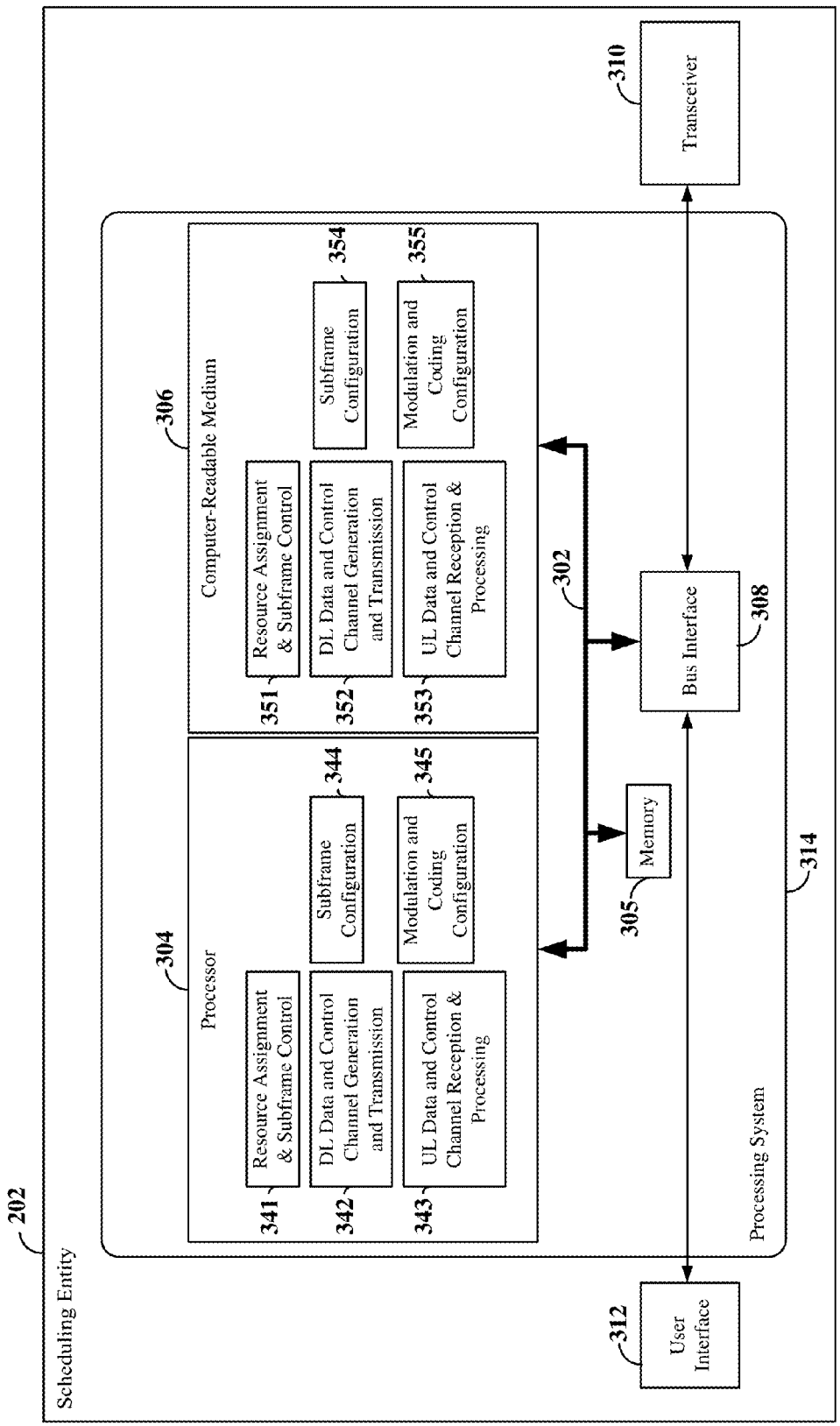
FIG. 3 is a block diagram illustrating an example of a hardware implementation for a scheduling entity employing a processing system according to some embodiments.

FIG. 3 is a conceptual diagram illustrating an example of a hardware implementation for a scheduling entity 202 employing a processing system 314. In accordance with various aspects of the disclosure, an element, or any portion of an element, or any combination of elements may be implemented with a processing system 314 that includes one or more processors 304.

In various aspects of the disclosure, the scheduling entity 202 may be any suitable radio transceiver apparatus, and in some examples, may be embodied by a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, peer, or some other suitable terminology. Within the present document, a base station may be referred to as a scheduling entity, indicating that the base station provides scheduling information to one or more subordinate entities.

In other examples, the scheduling entity 202 may be embodied by a wireless user equipment (UE). Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a UE may be referred to either as a scheduling entity, or a subordinate entity. That is, in various aspects of the present disclosure, a wireless UE may operate as a scheduling entity providing scheduling information to one or more subordinate entities, or may operate as a subordinate entity, operating in accordance with scheduling information provided by a scheduling entity.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in the scheduling entity 202, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, touch screen, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

In some aspects of the disclosure, the processor 304 may include resource assignment and subframe control circuitry 341, configured to generate, schedule, and modify a resource assignment or grant of time-frequency resources. For example, the resource assignment and subframe control circuitry 341 may generate one or more subframes, each including time-frequency resources assigned to carry data and/or control information to and/or from multiple subordinate entities. The resource assignment and subframe control circuitry 341 may operate in coordination with resource assignment and subframe control software 351.

The processor 304 may further include downlink (DL) data and control channel generation and transmission circuitry 342, configured to generate and transmit downlink data and control channels. The DL data and control channel generation and transmission circuitry 342 may operate in coordination with the resource assignment and subframe control circuitry 341 to schedule the DL data and/or control information and to place the DL data and/or control information onto a time division duplex (TDD) carrier within one or more subframes generated by the resource assignment and subframe control circuitry 341 in accordance with the resources assigned to the DL data and/or control information. The DL data and control channel generation and transmission circuitry 342 may further operate in coordination with DL data and control channel generation and transmission software 352.

The processor 304 may further include uplink (UL) data and control channel reception and processing circuitry 343, configured to receive and process uplink control channels and uplink data channels from one or more subordinate entities. In some examples, the UL data and control channel reception and processing circuitry 343 may be configured to receive scheduling requests from one or more subordinate entities, the scheduling requests being configured to request a grant of time-frequency resources for uplink user data transmissions. In other examples, the UL data and control channel reception and processing circuitry 343 may be configured to receive and process acknowledgement information (e.g., acknowledged/not acknowledged packets) from one or more subordinate entities. The UL data and control channel reception and processing circuitry 343 may operate in coordination with the resource assignment and subframe control circuitry 341 to schedule UL data transmissions, DL data transmissions and/or DL data retransmissions in accordance with the received UL control channel information. The UL data and control channel reception and processing circuitry 343 may further operate in coordination with UL data and control channel reception and processing software 353.

The processor 304 may further include subframe configuration circuitry 344, configured for providing a subframe structure for use by the resource assignment and subframe control circuitry 341 in generating one or more subframes for a TDD carrier. In accordance with aspects of the disclosure, the subframe configuration circuitry 344 may be configured to provide a self-contained TDD subframe structure, in which control, data and acknowledgement information are self-contained within a single TDD subframe. That is, the control/scheduling information provides control/scheduling for all of the data packets within the subframe and the acknowledgement information includes acknowledgement/not acknowledgement (ACK/NACK) signals for all of the data packets within the subframe. Therefore, the self-contained subframe structure may contain transmissions in both the uplink and the downlink directions.

In some examples, the self-contained TDD subframe structure includes DL control (scheduling) information, DL data information corresponding to the scheduling information and UL acknowledgement information corresponding to the data information. In other examples, the self-contained subframe structure includes DL control (scheduling) information, UL data information corresponding to the scheduling information and DL acknowledgement information corresponding to the data information. In an aspect, the subframe structure may be fixed in duration to enable operation in a synchronous network, in which the start of each subframe is aligned across the network. However, in various aspects of the disclosure, the subframe structure duration may be configurable and determined during system deployment and/or updated through system messages. The subframe configuration circuitry 344 may operate in coordination with subframe configuration software 354.

In an exemplary operation, the subframe configuration circuitry 344 may provide a subframe structure for a current subframe by first determining the duration of the current subframe and then determining whether the current subframe should include primarily UL data information or primarily DL data information. When the subframe configuration circuitry 344 determines that the current subframe should include primarily DL data information, the subframe configuration circuitry 344 provides a self-contained subframe structure that includes a DL control (scheduling) portion, a DL data portion and an UL acknowledgement portion. When the subframe configuration circuitry 344 determines that the current subframe should include primarily UL data information, the subframe configuration circuitry 344 provides a self-contained subframe structure that includes a DL control (scheduling) portion, an UL data portion and a DL acknowledgement portion. The subframe configuration circuitry 344 may further provide the subframe structure for the current subframe by determining the switch point times between UL and DL transmissions within the current subframe. In an aspect, the subframe structure for the current subframe may include deterministic times within the current subframe to switch from UL transmissions to DL transmissions. For example, when the current subframe includes a DL data portion, the switch point to begin including UL acknowledgement information from the subordinate entities may be predetermined within the subframe.

Based on the subframe structure for the current subframe, the DL data and control channel generation and transmission circuitry 342 may generate the current subframe by preparing control and/or data information in memory 305 and scheduling the control and/or data information via the resource assignment and subframe control circuitry 341 for transmission according to the subframe structure provided by the subframe configuration circuitry 344. The DL data and control channel generation and transmission circuitry 342 may further coordinate with the UL data and control reception and processing circuitry 343 to generate the current subframe, as described below.

In an aspect, when the subframe structure includes a DL data portion, the DL data and control channel generation and transmission circuitry 342 may include DL control (scheduling) information in the control portion and DL data information corresponding to the DL control information in the data portion of the subframe. For example, the DL data and control channel generation and transmission circuitry 342 may include DL control (scheduling) information by preparing the control (scheduling) information in memory 305 and loading the control (scheduling) information from memory 305 into the DL control portion of the subframe and may further include DL data information by preparing the DL data information in memory 305 and loading DL data information from memory 305 into the DL data portion of the subframe. The control (scheduling) information may include control (scheduling) information for new DL data packets and retransmitted DL data packets. As an example, the DL data and control channel generation and transmission circuitry 342 may further carry hybrid automatic repeat request (HARQ) configuration information within the control (scheduling) information for retransmitted DL data packets by preparing the HARQ configuration information in memory 305 and loading the HARQ configuration information from memory 305 into the DL control portion of the current subframe. The UL data and control channel reception and processing circuitry 343 may then include acknowledgement information in the acknowledgement portion of the current subframe by receiving and processing ACK/NACK packets sent from one or more subordinate entities in the current subframe.

In an aspect in which the subframe structure includes an UL data portion, the DL data and control channel generation and transmission circuitry 342 may include DL control (scheduling) information in the control portion of the current subframe by preparing the DL control (scheduling) information in memory 305 and loading the control (scheduling) information from memory 305 into the DL control portion. The UL data and control channel reception and processing circuitry 343 may then include UL data information in the data portion of the current subframe by receiving and processing the UL data information sent from one or more subordinate entities. The DL data and control channel generation and transmission circuitry 342 may then include acknowledgement information corresponding to the received UL data information by preparing the acknowledgement information (ACK/NACK packets) in memory 305 and loading the ACK/NACK packets from memory 305 into the acknowledgement portion of the current subframe.

The processor 304 may further include modulation and coding configuration circuitry 347, configured for determining a modulation and coding scheme (MCS) to utilize for downlink transmissions and/or a MCS for a subordinate entity to utilize for uplink transmissions. The modulation and coding configuration circuitry 347 may operate in coordination with modulation and coding configuration software 357.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
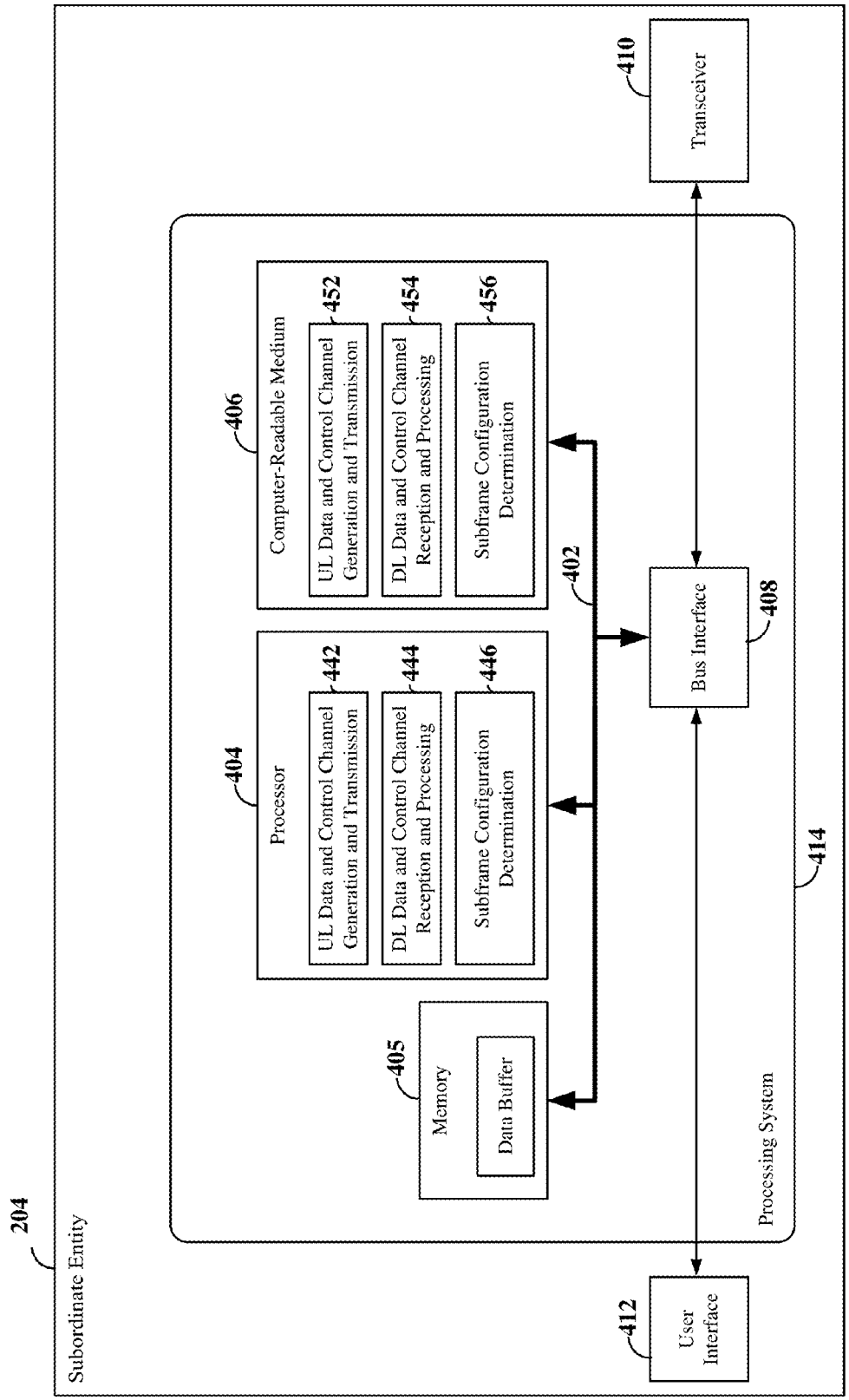
FIG. 4 is a block diagram illustrating an example of a hardware implementation for a subordinate entity employing a processing system according to some embodiments.

FIG. 4 is a conceptual diagram illustrating an example of a hardware implementation for an exemplary subordinate entity 204 employing a processing system 414. In accordance with various aspects of the disclosure, an element, or any portion of an element, or any combination of elements may be implemented with a processing system 414 that includes one or more processors 404.

The processing system 414 may be substantially the same as the processing system 314 illustrated in FIG. 3, including a bus interface 408, a bus 402, memory 405, a processor 404, and a computer-readable medium 406. Furthermore, the subordinate entity 204 may include a user interface 412 and a transceiver 410 substantially similar to those described above in FIG. 3. The processor 404, as utilized in a subordinate entity 204, may be used to implement any one or more of the processes described below.

In some aspects of the disclosure, the processor 404 may include uplink (UL) data and control channel generation and transmission circuitry 442, configured to generate and transmit uplink data on an UL data channel, and to generate and transmit uplink control/feedback/acknowledgement information on an UL control channel. The UL data and control channel generation and transmission circuitry 442 may operate in coordination with UL data and control channel generation and transmission software 452. The processor 404 may further include downlink (DL) data and control channel reception and processing circuitry 444, configured for receiving and processing downlink data on a data channel, and to receive and process control information on one or more downlink control channels. In some examples, received downlink data and/or control information may be temporarily stored in a data buffer within memory 405. The DL data and control channel generation and transmission circuitry 444 may operate in coordination with DL data and control channel generation and transmission software 454.

The processor 404 may further include subframe configuration determination circuitry 446, configured for determining a subframe structure and subframe duration for one or more subframes. For example, the subframe structure for a current subframe may be determined based on structure information received from the scheduling entity in the DL control portion of a previous subframe. The subframe configuration determination circuitry 446 may operate in coordination with the subframe configuration determination software 456.

In an exemplary operation, the subframe configuration determination circuitry may provide a subframe structure for a current subframe by determining the subframe structure identified by the scheduling entity (e.g., based on subframe structure information received in the DL control portion of a previous subframe). Based on the subframe structure for the current subframe, as determined by the subframe configuration determination circuitry 446, the UL data and control channel generation and transmission circuitry 442 may prepare control and/or data information in memory 405 for transmission according to the subframe structure. In an aspect, when the subframe structure includes a DL data portion, the DL data and control channel reception and processing circuitry 444 may receive and process DL control information included in the control portion of the current subframe from the scheduling entity and DL data information included in the data portion of the current subframe from the scheduling entity. The UL data and control channel generation and transmission circuitry 442 may then include acknowledgement information corresponding to the received UL data information by preparing the acknowledgement information (ACK/NACK packets) in memory 405 and loading the ACK/NACK packets from memory 405 into the acknowledgement portion of the current subframe.

In an aspect in which the subframe structure includes an UL data portion, the DL data and control channel reception and processing circuitry 444 may receive and process DL control information included in the control portion of the subframe. The UL data and control channel generation and transmission circuitry 442 may then include UL control and/or data information in the data portion of the current subframe by preparing the UL control and/or data information in memory 405 and loading the UL control and/or data information from memory 405 into the data portion of the current subframe. The DL data and control channel reception and processing circuitry 444 may then receive and process acknowledgement information (ACK/NACK packets) corresponding to the transmitted UL data packets in the acknowledgement portion of the current subframe.

Figure 5:
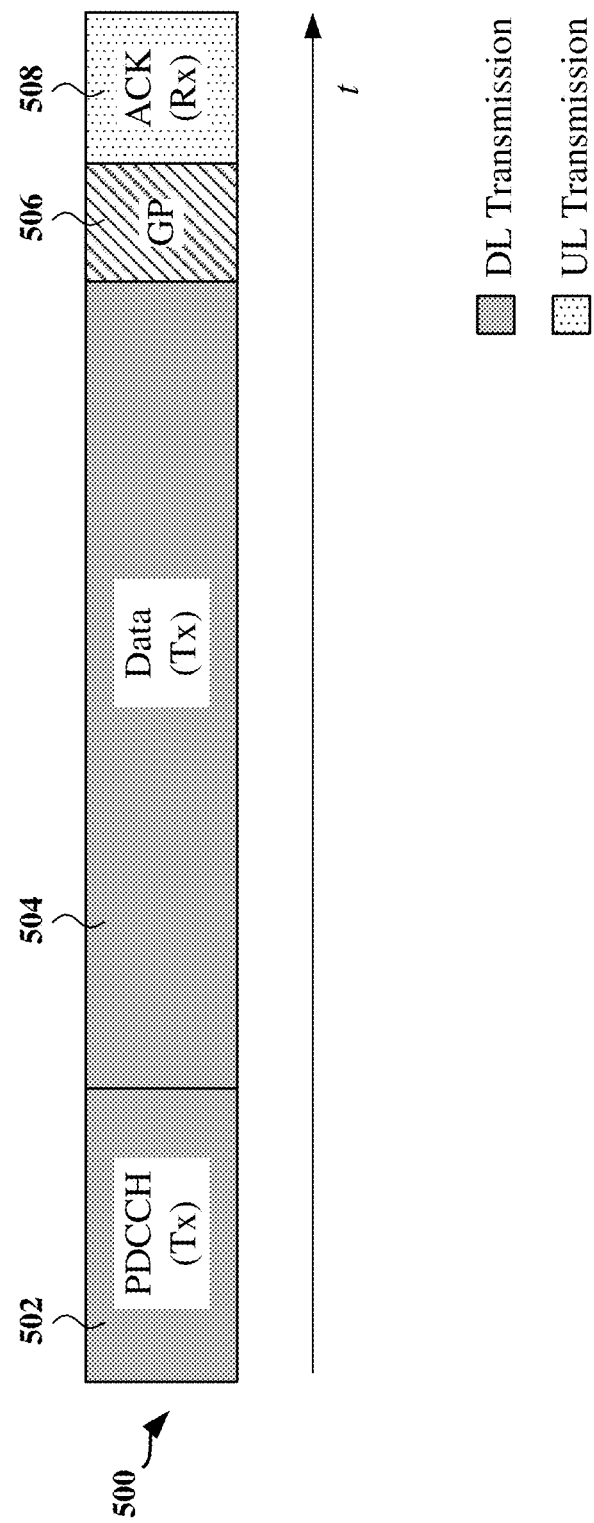
FIG. 5 is a diagram illustrating an example of a time division duplex (TDD) self-contained subframe structure that may be used in some networks.

FIG. 5 illustrates an exemplary structure of a self-contained TDD subframe 500. The self-contained subframe 500 may have a fixed duration (t), but may also be configurable and determined during network deployment and/or may be updated through system messages. In one example, the duration of the self-contained subframe 500 may be 500 μs. Of course, any suitable subframe duration may be utilized within the scope of the present disclosure.

The self-contained subframe structure shown in FIG. 5 is a transmitter-scheduled subframe, referred to herein as a downlink TTI subframe or DL-centric subframe 500. The DL-centric subframe 500 may be used to carry control and data information to one or more subordinate entities, which may be UEs for example, and to also receive acknowledgement information from the subordinate entity or entities within the same subframe. Thus, each DL-centric subframe includes both DL transmissions and UL transmissions and is divided with respect to time (t) into DL transmission and UL transmission portions.

In the example shown in FIG. 5, the DL transmission portions include a control portion 502 and a data portion 504, and the UL transmission portions include an acknowledgement (ACK/NACK) portion 508. Therefore, within the subframe structure of FIG. 5, the scheduling entity first has an opportunity to transmit control/scheduling information in the control portion 502, and then an opportunity to transmit data in the DL data portion 504. Following a guard period (GP) portion 506, the scheduling entity has an opportunity to receive acknowledged (ACK)/not acknowledged (NACK) signals (ACK/NACK packets) from subordinate entities using the carrier. This frame structure is downlink-centric, as more resources are allocated for transmissions in the downlink direction (e.g., transmissions from the scheduling entity) than for transmissions in the uplink direction (e.g., transmissions from the subordinate entities).

In one example, the control information portion 502 may be used to transmit a physical downlink control channel (PDCCH) indicating time-frequency assignments of data packets intended for one or more subordinate entities, and the DL data portion 504 may be used to transmit a data payload including the data packets intended for the one or more subordinate entities within the assigned time-frequency slots. Thus, each subordinate entity that will be receiving data in the data portion 504 of the subframe 500 may be individually addressed in the control portion 502 of the subframe 500, so that the subordinate entities can receive and process the correct downlink data packets. Thus, all of the data packets transmitted within the subframe 500 may be scheduled according to the scheduling information in the control information portion 502 of the same subframe 500. Following the GP portion 506, the scheduling entity may receive an ACK signal (or a NACK signal) during the ACK/NACK portion 508 from each subordinate entity that received data packets during the data portion 504 to indicate whether the data packets were successfully received. Thus, all of the data packets transmitted within the subframe 500 may be acknowledged/not acknowledged within the same subframe 500.

In other examples, the control portion 502 may be used to transmit other downlink control channels and/or other downlink pilots, such as the channel state information-reference signal (CSI-RS). These additional downlink channels and/or pilots, along with any other downlink control information, may be transmitted together with the PDCCH within the control portion 502. Broadly, any suitable transmission in the DL direction may be made complementary to the control information described above within the control portion 502. In addition, the ACK/NACK portion 508 may also be used for transmission of other uplink control channels and information, such as the physical uplink control channel (PUCCH), random access channel (RACH), scheduling request (SR), sounding reference signal (SRS), channel quality indicator (CQI), channel state feedback information and buffer status. Broadly, any suitable transmission in the UL direction may be made complementary to the ACK/NACK and other information described above within the ACK/NACK portion 508.

In an aspect, the data portion 504 may be used to multiplex DL data transmissions to a set of subordinate entities (i.e., two or more subordinate entities) within the subframe 500. For example, the scheduling entity may multiplex downlink data to the set of subordinate entities using time division multiplexing (TDM), frequency division multiplexing (FDM) (i.e., OFDM), code division multiplexing (CDM), and/or any suitable multiplexing scheme known to those of ordinary skill in the art. Thus, the DL data portion 504 may include data for multiple users and up to a high order of multi-user MIMO. In addition, the control portion 502 and ACK/NACK portion 508 may also be used to multiplex control information to or from a set of subordinate entities in a TDM, FDM, CDM, and/or other suitable manner.

The GP portion 506 may be scheduled to accommodate variability in UL and DL timing. For example, latencies due to RF antenna direction switching (e.g., from DL to UL) and RF settling (e.g., settling of phase lock loops, filters and power amplifiers), along with transmission path latencies, may cause the subordinate entity to transmit early on the UL to match DL timing. Such early transmission may interfere with symbols received from the scheduling entity. Accordingly, the GP portion 506 may allow an amount of time after the DL data portion 504 to prevent interference, where the GP portion 506 may provide an appropriate amount of time for the scheduling entity to switch its RF antenna direction, for the over-the-air (OTA) transmission time, and time for ACK processing by the subordinate entity. The GP portion 506 may further provide an appropriate amount of time for the subordinate entity to switch its RF antenna direction (e.g., from DL to UL), to processes the data payload, and for the over-the-air (OTA) transmission time.

The duration of the GP portion 506 may be configurable based on, for example, the cell size and/or processing time requirements. For example, the GP portion 506 may have a duration of one symbol period (e.g., 31.25 μs). However, in accordance with aspects of the disclosure, the switch point from DL to UL transmissions may be deterministic throughout the network. Thus, although the beginning point of the GP portion 506 may be variable and configurable, the ending point of the GP portion 506 corresponding to the switch point from DL transmissions to UL transmissions may be fixed by the network to manage interference between DL and UL transmissions. In an aspect, the switch point may be updated by the network in a semi-static manner and indicated in the PDCCH. In addition, the GP duration and/or beginning point of the GP portion 506 may also be indicated in the PDCCH.

In networks utilizing unlicensed spectrum, the switch point may be maintained at a deterministic location, common to different cells. In scenarios in which the amount of data to be transmitted is less than that allocated to the data portion 504, to avoid losing access to the TDD carrier, the data portion 504 of the subframe 500 can be filled by either extending the transmission to occupy only a portion of the frequency band or filling in the transmission with pilots or other filler symbols.

Figure 6:
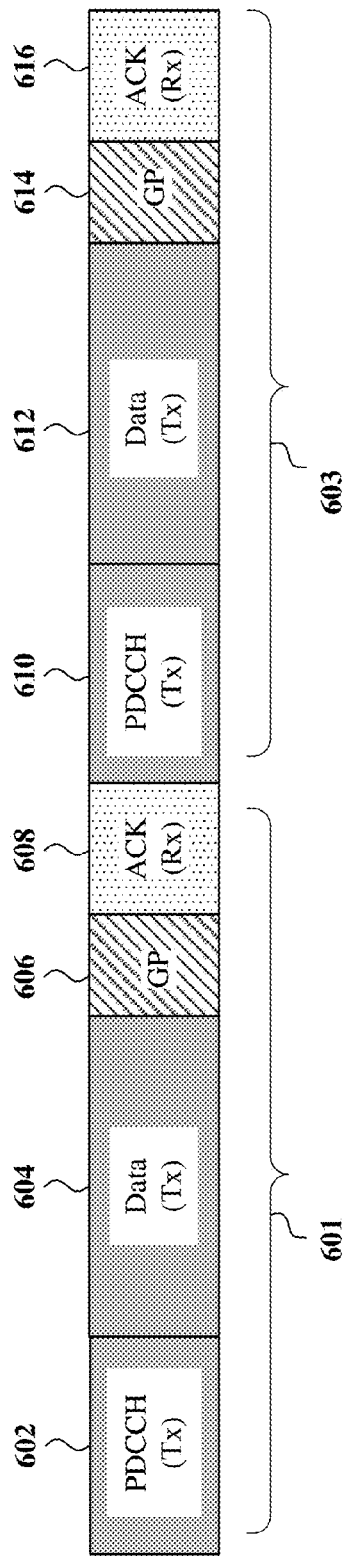
FIG. 6 is a diagram illustrating contiguous TDD subframes, each having a TDD self-contained subframe structure that may be used in some networks.

FIG. 6 illustrates two contiguous DL-centric subframes 601 and 603. Each subframe 601 and 603 has the same subframe structure as that shown in FIG. 5. For example, subframe 601 includes a DL control portion 602 followed by a DL data portion 604, a guard period (GP) 606 and an UL ACK/NACK portion 608. Likewise, subframe 603 includes a DL control portion 610, DL data portion 612, GP 614 and UL ACK/NACK portion 616.

In an example, control information may be transmitted by the scheduling entity in the control portion 602 of the first DL-centric subframe 601, data information corresponding to the control information may be transmitted by the scheduling entity in the data portion 604 of the first DL-centric subframe 601 and acknowledgement information corresponding to the data information may be received by the scheduling entity from subordinate entities in the ACK/NACK portion 608 of the first DL-centric subframe 601. According to an aspect of the present disclosure, all of the data packets in the data portion 604 may be acknowledged or not within the ACK/NACK portion 608, that is, prior to the next scheduling instance. Here, the next scheduling instance refers to the scheduling of further data packets within the data portion 612 of the subsequent subframe 603, which are to be scheduled in the control portion 610 of the subframe 603.

Based on the ACK/NACK information received in the ACK/NACK portion 608 of the first DL-centric subframe 601, the scheduling entity may generate control information for the control portion 610 of the next (second) DL-centric subframe 603. For example, if the ACK/NACK information includes a NACK signal, at least part of the coded bits of the data information transmitted in the data portion 604 of the first DL-centric subframe 601 may be retransmitted (e.g., in an incremental redundancy HARQ algorithm, described further below) in the data portion 612 of the second DL-centric subframe 603. Thus, in accordance with aspects of the disclosure, all of the data packets transmitted in the first DL-centric subframe 601 are acknowledged/not acknowledged prior to the next (second) DL-centric subframe 603 to enable the scheduling entity to generate control information for the second DL-centric subframe 603 based on the ACK/NACK information in the first DL-centric subframe 601.

In an exemplary aspect of the disclosure, a hybrid automatic repeat request (HARQ) retransmission scheme is used to retransmit data incorrectly received. Thus, the control information (PDCCH) in the control portion 610 of the second DL-centric subframe 603 may further carry HARQ-related configuration information, such as HARQ identifiers, redundancy version, etc., to provide support for data retransmissions occurring in the data portion 612 of the second DL-centric subframe 603. For example, the control information may be configured to indicate whether or not a data packet included in the data portion is a HARQ retransmission.

The self-contained subframe structure shown in FIG. 6 supports single HARQ interlace processing at the physical layer to enable high data rates in extreme bandwidth cases with a reasonable HARQ buffer cost. By reducing or minimizing the ACK and retransmission latency at the physical layer, the self-contained subframe structure further reduces or minimizes the overall end-to-end latency.

Figure 7:
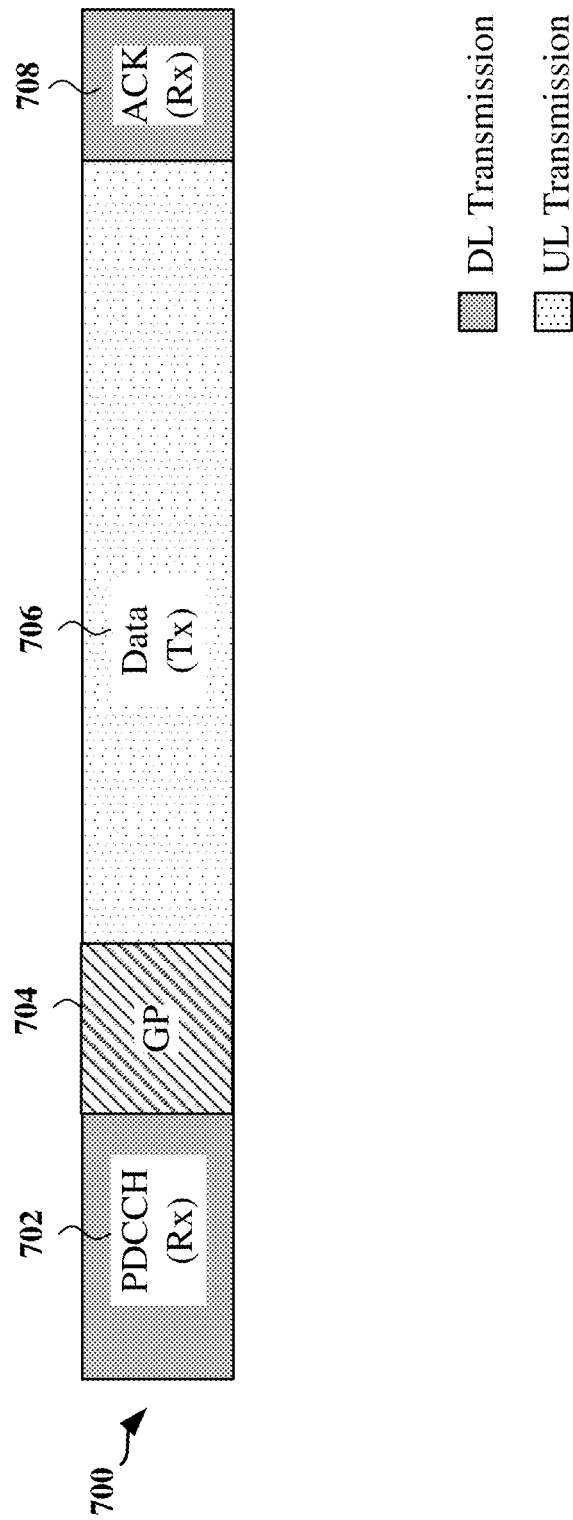
FIG. 7 is a diagram illustrating an example of a TDD self-contained subframe structure that may be used in some networks.

FIG. 7 illustrates another exemplary structure of a self-contained TDD subframe 700. The self-contained subframe structure shown in FIG. 7 is a receiver-scheduled subframe, referred to herein as an uplink TTI subframe or UL-centric subframe 700. The UL-centric subframe 700 may be used to receive downlink control information from the scheduling entity, transmit uplink data to a scheduling entity, and receive a downlink ACK/NACK signal for the transmitted data from the scheduling entity. Thus, each UL-centric subframe 700 also includes both DL transmissions and UL transmissions and is divided with respect to time (t) into DL transmission and UL transmission portions.

In the example shown in FIG. 7, the DL transmission portions include a control portion 702 and an acknowledgement portion 708, and the UL transmission portions include a data portion 706. Therefore, within the UL-centric subframe structure shown in FIG. 7, the subordinate entity first has an opportunity to receive control information in the control portion 702. Following a GP portion 704, the subordinate entity has an opportunity to transmit data in the UL data portion 706 and to receive acknowledgement information (e.g., an ACK/NACK signal) in the ACK/NACK portion 708. This frame structure is uplink-centric, as more resources are allocated for transmissions in the uplink direction (e.g., transmissions from the subordinate entity) than in the downlink direction (e.g., transmissions from the scheduling entity).

In one example, the control information portion 702 may be used to transmit a physical downlink control channel (PDCCH) indicating time-frequency assignments of data packets to be transmitted by one or more subordinate entities and the data portion 706 may be used to by the subordinate entities to transmit their data packets to the scheduling entity within the assigned time-frequency slots. Each subordinate entity that transmitted data within the data portion 706 may then receive an ACK signal (or a NACK signal) during the ACK/NACK portion 708 from the scheduling entity to indicate whether the data packets were successfully received at the scheduling entity. Thus, all of the data packets transmitted within the subframe 700 may be acknowledged/not acknowledged within the same subframe 700.

In other examples, the control portion 702 and/or ACK/NACK portion 708 may be used to transmit other downlink control channels and information and/or data from other layers. In addition, the data portion 706 may also be used to transmit uplink control channels and information. For example, the control portion 702 of a subframe 700 may carry a data transmission (e.g., a small payload of data) for a subordinate entity, such as an application layer (or layer other than the physical layer) ACK from a previous subframe. The subordinate entity may then acknowledge the data transmission in the data portion 706 of the same subframe 700.

In an aspect, the UL data portion 706 may be used to carry data transmissions from a set of subordinate entities (i.e., two or more subordinate entities) within the subframe 500 using one or more TDMA, FDMA, CDMA, or any other suitable multiple access scheme. Thus, the UL data portion 706 may include packets from multiple users and up to a high order of multi-user MIMO. In addition, the control portion 702 and ACK/NACK portion 708 may also be used to carry control information to a set of subordinate entities in a TDMA, FDMA, CDMA, or other suitable multiple access manner.

Figure 8:
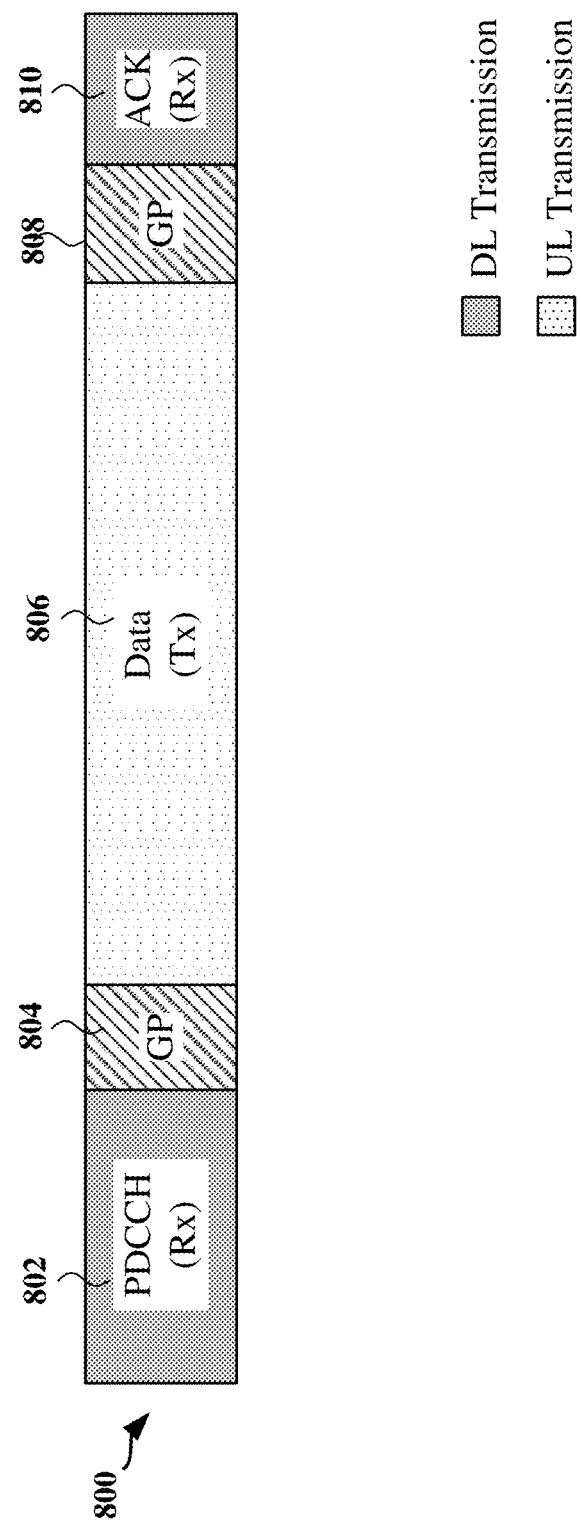
FIG. 8 is a diagram illustrating an example of a TDD self-contained subframe structure that may be used in some networks.

FIG. 8 illustrates another exemplary structure of a self-contained TDD subframe 800. In the example shown in FIG. 8, an UL-centric subframe 800 may include two GP portions 804 and 808. Each GP portion 804 and 808 separates UL transmissions from DL transmissions to provide an appropriate amount of time for the scheduling and subordinate entities to switch their RF antenna directions. Therefore, within the UL-centric subframe structure shown in FIG. 8, the subordinate entity first has an opportunity to receive control information in the control portion 802. Following a first GP portion 804, the subordinate entity has an opportunity to transmit data in the UL data portion 806. Following a second GP portion 808, the subordinate entity subsequently has an opportunity to receive an ACK/NACK signal in the ACK/NACK portion 810 from the scheduling entity using the TDD carrier.

The duration of each GP portion 804 and 808 may be configurable based on, for example, the cell size and/or processing time requirements. In an aspect, the combined duration of the GP portions 804 and 808 is substantially equivalent to the duration of the single GP portion 704, shown in FIG. 7. In another aspect, the duration of GP portion 804 may be equivalent to or different from the duration of GP portion 808. In addition, in accordance with aspects of the disclosure, the switch points from DL to UL and from UL to DL transmissions may be deterministic throughout the network. Thus, although the beginning point of each GP portion 804 and 808 may be variable and configurable, the ending point of each GP portion 804 and 808 corresponding to the switch point between DL/UL transmissions may be fixed by the network to manage interference between DL and UL transmissions.

Figure 9:
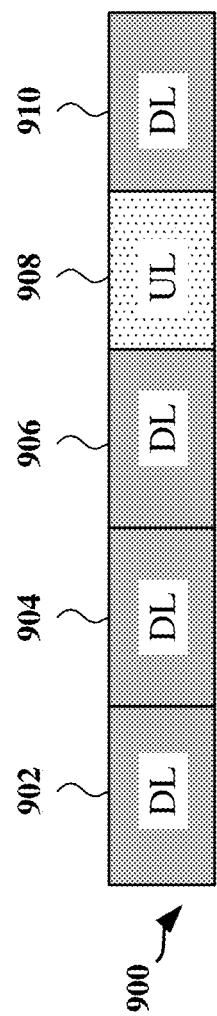
FIG. 9 is a diagram illustrating an example of a sequence of TDD subframes, each having a TDD self-contained subframe structure that may be used in some networks.

FIG. 9 illustrates an example of a consecutive sequence 900 of TDD self-contained subframes 902, 904, 906, 908 and 910, each having a TDD self-contained subframe structure. The first three subframes 902, 904 and 906 are DL-centric subframes, each having, for example, the subframe structure shown in FIG. 5. Following the third DL-centric subframe 906 is an UL-centric subframe 908, which may have, for example, the subframe structure shown in FIG. 7 or FIG. 8. An additional DL-centric subframe 910 follows the UL-centric subframe. The sequence 900 contains more DL-centric subframes than UL-centric subframes to provide sufficient resources to obtain high data rates for downlink data transmission applications. In other examples, UL-centric and DL-centric subframes may alternate or a greater number of UL-centric subframes may be provided in a particular sequence of subframes.

By utilizing a TDD self-contained subframe structure, such as those shown in FIGS. 5-8, resources for the transmission of feedback, such as an ACK/NACK, can be made available within the same subframe for all data information transmitted within that subframe. In this way, a device utilizing this subframe structure need not wait for, or depend on, packets in a subsequent subframe. That is, subframes may accordingly be considered as discrete units.

Because the subframes can be considered independent or discrete, additional flexibility in the management of the air interface resources can be provided. For example, at any given time, at the end of any given subframe, the channel can easily be modified to pause or end communication utilizing the TDD carrier, and interpose other communication on the same spectrum resources, without causing substantial issues, e.g., in terms of having data packets waiting for ACK/NACK packets corresponding to data packets transmitted in previous subframes. In one example, a gap between subframe transmissions may be created to allow multiplexing of different types of traffic on the spectrum, including D2D, mesh, or a non-backward compatible technology.

Of course, these examples of self-contained subframe structures are merely provided to illustrate certain concepts of the invention. Those of ordinary skill in the art will comprehend that these are merely exemplary in nature, and other examples may fall within the scope of the disclosure.

Figure 10:
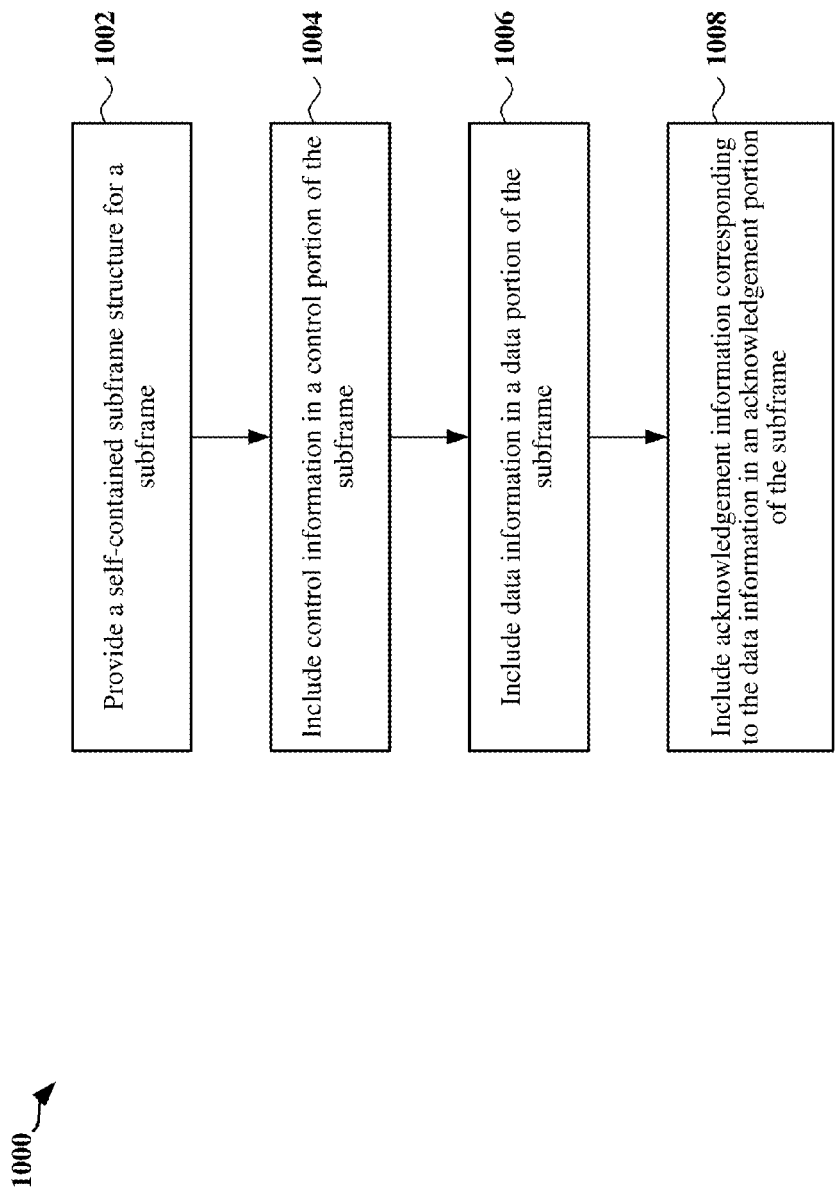
FIG. 10 is a flow chart of a method of wireless communication.

FIG. 10 is a flow chart 1000 of a method of wireless communication. The method may be performed by a scheduling entity 202 as described above and illustrated in FIG. 2, by a processor or processing system, or by any suitable means for carrying out the described functions.

At block 1002, the scheduling entity may provide a self-contained subframe structure for a TDD carrier, including a control portion, a data portion and an acknowledgement portion. For example, with reference to FIGS. 5-8, the self-contained subframe structure may be a DL-centric subframe or an UL-centric subframe, in which the control information, data information corresponding to the control information and acknowledgement information corresponded to the data information are included within a single TDD subframe.

At block 1004, the scheduling entity generates a subframe having the self-contained subframe structure and includes control information in the control portion of the subframe. For a DL-centric subframe, the control information may include a PDCCH indicating the time-frequency resource assignments for data transmissions from the scheduling entity to a set of subordinate entities. For an UL-centric subframe, the control information may include a PDCCH indicating the time-frequency resource assignments for data transmissions from the set of subordinate entities to the scheduling entity. In addition, other downlink control information may also be included within the control portion.

At block 1006, data information corresponding to the control information is included in the data portion of the subframe. For example, in a DL-centric subframe, the data information may include data packets transmitted to the set of subordinate entities multiplexed onto a downlink data channel. In an UL-centric subframe, the data information may include data packets transmitted from the set of subordinate entities combined onto an uplink data channel utilizing a multiple access scheme.

At block 1008, acknowledgement information corresponding to the data information is included in the acknowledgement portion of the subframe. For example, in a DL-centric subframe, an ACK/NACK message from each subordinate entity that received data in the data portion of the subframe may be included in the acknowledgement portion of the subframe to indicate whether the subordinate entities correctly received the downlink data. In an UL-centric subframe, the acknowledgement information may include respective ACK/NACK messages to each of the subordinate entities that transmitted data in the data portion of the subframe to indicate whether the scheduling entity correctly received the uplink data.

Figure 11:
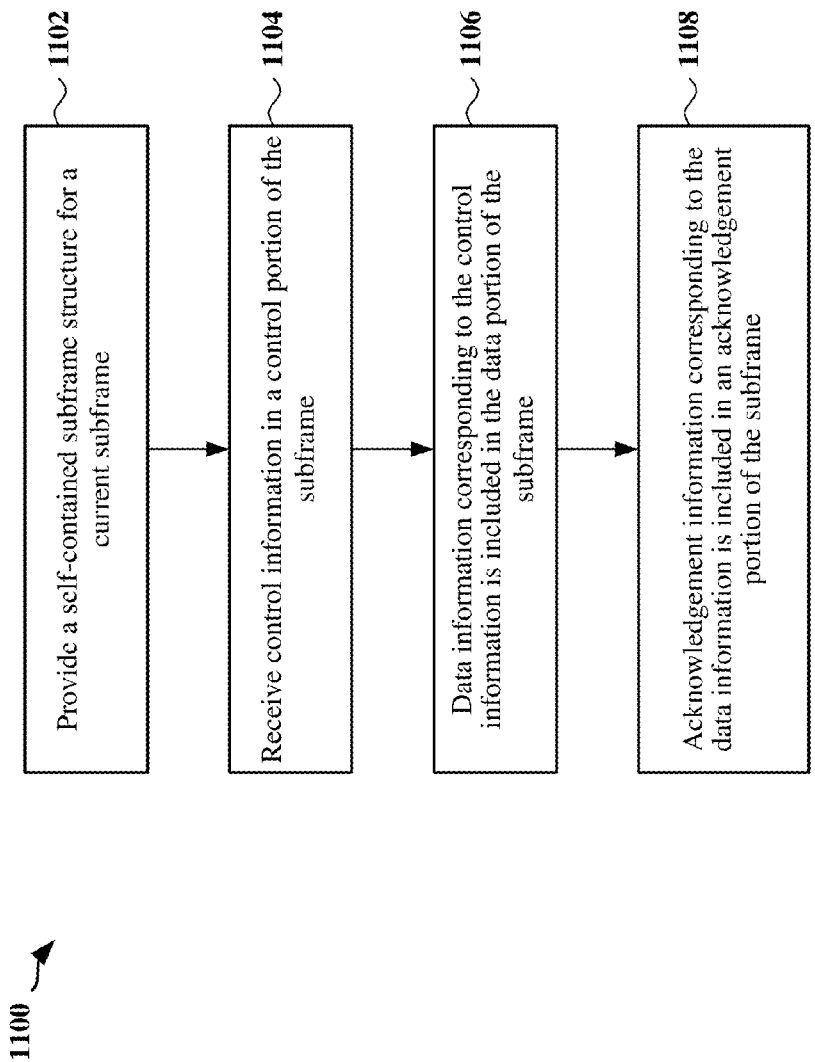
FIG. 11 is a flow chart of another method of wireless communication.

FIG. 11 is a flow chart 1100 of a method of wireless communication. The method may be performed by a subordinate entity 204 as described above and illustrated in FIG. 2, by a processor or processing system, or by any suitable means for carrying out the described functions.

At block 1102, the subordinate entity may provide a self-contained subframe structure for a current subframe, including a control portion, a data portion and an acknowledgement portion. For example, with reference to FIGS. 5-8, the self-contained subframe structure may be a DL-centric subframe or an UL-centric subframe, in which the control information, data information corresponding to the control information and acknowledgement information corresponded to the data information are included within a single TDD subframe.

At block 1104, the subordinate entity receives control information in the control portion of the subframe. For a DL-centric subframe, the control information may include a PDCCH indicating the time-frequency resource assignments for data transmissions from the scheduling entity to the subordinate entity. For an UL-centric subframe, the control information may include a PDCCH indicating the time-frequency resource assignments for data transmissions from the subordinate entity to the scheduling entity. In addition, other downlink control information may also be included within the control portion.

At block 1106, data information corresponding to the control information is included in the data portion of the subframe. For example, in a DL-centric subframe, the data information may include data packets transmitted to the subordinate entity on a downlink data channel. In an UL-centric subframe, the data information may include data packets transmitted from the subordinate entity on an uplink data channel.

At block 1108, acknowledgement information corresponding to the data information is included in the acknowledgement portion of the subframe. For example, in a DL-centric subframe, an ACK/NACK message from the subordinate entity may be included in the acknowledgement portion of the subframe to indicate whether the subordinate entity correctly received the downlink data. In an UL-centric subframe, the acknowledgement information may include an ACK/NACK message to the subordinate entity o indicate whether the scheduling entity correctly received the uplink data.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication in a synchronous network for a subordinate entity to communicate with a scheduling entity utilizing a time division duplex (TDD) carrier, wherein the TDD carrier comprises a plurality of subframes, the method comprising:
   utilizing a subframe structure for each of the plurality of subframes, each of the plurality of subframes comprising a same duration, the subframe structure comprising a control portion, a data portion, and an acknowledgement portion;
   receiving scheduling information in the control portion of a subframe of the plurality of subframes;
   receiving data information corresponding to the scheduling information in the data portion of the subframe; and
   transmitting acknowledgement information corresponding to the data information in the acknowledgement portion of the subframe, wherein the control portion, the data portion, and the acknowledgement portion are contained in the same subframe.

2. The method of claim 1, wherein the subframe structure has a configurable subframe duration, wherein the configurable subframe duration comprises the same duration across the plurality of subframes.

3. The method of claim 2, wherein the configurable subframe duration is fixed across the synchronous network.

4. The method of claim 1, wherein transmitting the acknowledgement information further comprises:
   beginning the acknowledgement information at a predetermined time in the subframe.

5. The method of claim 1, wherein the control portion comprises control information comprising the scheduling information, the control information comprising at least one of a physical downlink control channel or a pilot signal.

6. The method of claim 5, further comprising:
   receiving hybrid automatic repeat request (HARQ) configuration information within the physical downlink control channel.

7. The method of claim 5, further comprising:
   receiving in the physical downlink control channel a predetermined time within the subframe to begin the acknowledgement information.

8. The method of claim 1, wherein the data information comprises at least one data packet and wherein receiving the data information further comprises:
   receiving the at least one data packet multiplexed with a plurality of other data packets within the data portion of the subframe using at least one of time division multiplexing, frequency division multiplexing, or code division multiplexing.

9. The method of claim 1, wherein transmitting the acknowledgement information further comprises:
   transmitting an acknowledged/not acknowledged (ACK/NACK) packet indicating whether the subordinate entity correctly received the data information for the subordinate entity in the data portion of the subframe.

10. The method of claim 1, further comprising:
    transmitting uplink information within the acknowledgement portion of the subframe.

11. The method of claim 10, wherein the uplink information comprises at least one of a physical uplink control channel, random access channel, scheduling request, sounding reference signal, channel quality indicator, channel state feedback information, or buffer status.

12. The method of claim 1, further comprising:
    including a guard period between the data portion of the subframe and the acknowledgement portion of the subframe.

13. The method of claim 12, wherein the guard period has a configurable guard period duration.

14. A method of wireless communication in a synchronous network for a subordinate entity to communicate with a scheduling entity utilizing a time division duplex (TDD) carrier, wherein the TDD carrier comprises a plurality of subframes, the method comprising:
    utilizing a subframe structure for each of the plurality of subframes, each of the plurality of subframes comprising a same duration, the subframe structure comprising a control portion, a data portion, and an acknowledgement portion;
    receiving scheduling information in the control portion of a subframe of the plurality of subframes;
    transmitting data information corresponding to the scheduling information in the data portion of the subframe; and
    receiving acknowledgement information corresponding to the data information in the acknowledgement portion of the subframe, wherein the control portion, the data portion, and the acknowledgement portion are contained in the same subframe.

15. The method of claim 14, wherein the scheduling information comprises resources available for use by the subordinate entity for transmitting the data information within the subframe.

16. The method of claim 14, wherein receiving the acknowledgement information further comprises:
receiving an acknowledged/not acknowledged (ACK/NACK) packet from the scheduling entity indicating whether the scheduling entity correctly received the data information.

17. The method of claim 14, wherein receiving the scheduling information further comprises:
receiving a data packet in the control portion of the subframe, wherein the data portion of the subframe further comprises an acknowledgement packet corresponding to the data packet.

18. The method of claim 14, further comprising:
including a guard period between the control portion of the subframe and the data portion of the subframe.

19. The method of claim 18, further comprising:
including an additional guard period between the data portion of the subframe and the acknowledgement portion of the subframe.

20. The method of claim 19, wherein each of the guard period and the additional guard period has a respective configurable guard period duration.

21. A subordinate entity configured to wirelessly communicate with a scheduling entity in a synchronous network, comprising:
a processor;
a wireless transceiver communicatively coupled to the processor; and
a memory communicatively coupled to the processor, wherein the processor is configured to:
utilize a subframe structure for each of a plurality of subframes within a time division duplex (TDD) carrier, each of the plurality of subframes comprising a same duration, the subframe structure comprising a control portion, a data portion, and an acknowledgement portion;
receive scheduling information in the control portion of a subframe of the plurality of subframes via the wireless transceiver;
receive data information corresponding to the scheduling information in the data portion of the subframe via the wireless transceiver; and
transmit acknowledgement information corresponding to the data information in the acknowledgement portion of the subframe via the wireless transceiver, wherein the control portion, the data portion, and the acknowledgement portion are contained in the same subframe.

22. The subordinate entity of claim 21, wherein the control portion comprises control information comprising the scheduling information, the control information comprising at least one of a physical downlink control channel or a pilot signal, and wherein the processor is further configured to:
receive hybrid automatic repeat request (HARQ) configuration information within the physical downlink control channel; and
receive in the physical downlink control channel a predetermined time within the subframe to begin the acknowledgement information.

23. The subordinate entity of claim 21, wherein the data information comprises at least one data packet and wherein the processor is further configured to:
receive the at least one data packet multiplexed with a plurality of other data packets within the data portion of the subframe using at least one of time division multiplexing, frequency division multiplexing, or code division multiplexing.

24. The subordinate entity of claim 21, wherein the processor is further configured to:
transmit an acknowledged/not acknowledged (ACK/NACK) packet indicating whether the subordinate entity correctly received the data information for the subordinate entity in the data portion of the subframe.

25. The subordinate entity of claim 21, wherein the processor is further configured to:
transmit uplink information within the acknowledgement portion of the subframe.

26. The subordinate entity of claim 21, wherein the processor is further configured to:
include a guard period between the data portion of the subframe and the acknowledgement portion of the subframe.

27. A subordinate entity configured to wirelessly communicate with a scheduling entity in a synchronous network, comprising:
a processor;
a wireless transceiver communicatively coupled to the processor; and
a memory communicatively coupled to the processor, wherein the processor is configured to:
utilize a subframe structure for each of a plurality of subframes within a time division duplex (TDD) carrier, each of the plurality of subframes comprising a same duration, the subframe structure comprising a control portion, a data portion, and an acknowledgement portion;
receive scheduling information in the control portion of a subframe of the plurality of subframes via the wireless transceiver;
transmit data information corresponding to the scheduling information in the data portion of the subframe via the wireless transceiver; and
receive acknowledgement information corresponding to the data information in the acknowledgement portion of the subframe via the wireless transceiver, wherein the control portion, the data portion, and the acknowledgement portion are contained in the same subframe.

28. The subordinate entity of claim 27, wherein the processor is further configured to:
receive a data packet in the control portion of the subframe; and
transmit an acknowledgement packet corresponding to the data packet in the data portion of the subframe.

29. The subordinate entity of claim 27, wherein the processor is further configured to:
include a guard period between the control portion of the subframe and the data portion of the subframe.

30. The subordinate entity of claim 29, wherein the processor is further configured to:
include an additional guard period between the data portion of the subframe and the acknowledgement portion of the subframe.

31. A method of wireless communication for a subordinate entity to communicate with a scheduling entity utilizing a time division duplex (TDD) carrier via a plurality of subframes, the method comprising:
utilizing a subframe structure for at least a set of a plurality of subframes, each of the plurality of subframes in the set having a same duration, the subframe structure comprising a control portion, a data portion, and an acknowledgement portion;
receiving scheduling information in the control portion of a subframe of the plurality of subframes;
receiving data information corresponding to the scheduling information in the data portion of the subframe that is associated with a set of subordinate entities; and
transmitting acknowledgement information corresponding to the data information in the acknowledgement portion of the subframe, wherein the control portion, the data portion, and the acknowledgement portion are contained in the same subframe.

32. The method of claim 31, wherein the plurality of subframes are each defined by a plurality of transmission time intervals (TTIs) for carrying at least one of uplink data or downlink data.

33. The method of claim 31, wherein the plurality of subframes are each defined by a plurality of transmission time intervals (TTIs) each comprising a block of data and corresponding to a collection of symbols.

34. The method of claim 31, wherein the subframe is defined by a plurality of transmission time intervals (TTIs) and each TTI comprises information configured to be independently decoded relative to other TTIs.

35. The method of claim 31, wherein the subframe is defined by a plurality of transmission time intervals (TTIs) that are configurable to carry at least one of downlink data or uplink data.

36. A subordinate entity configured to wirelessly communicate with a scheduling entity in a wireless network, comprising:
a processor;
a wireless transceiver communicatively coupled to the processor; and
a memory communicatively coupled to the processor, wherein the processor is configured to:
utilize a subframe structure for at least a set of a plurality of subframes within a time division duplex (TDD) carrier, each of the plurality of subframes in the set having a same duration, the subframe structure comprising a control portion, a data portion, and an acknowledgement portion;
receive scheduling information in the control portion of a subframe of the plurality of subframes;
receive data information corresponding to the scheduling information in the data portion of the subframe that is associated with a set of subordinate entities; and
transmit acknowledgement information corresponding to the data information in the acknowledgement portion of the subframe, wherein the control portion, the data portion, and the acknowledgement portion are contained in the same subframe.

37. The subordinate entity of claim 36, wherein the plurality of subframes are each defined by a plurality of transmission time intervals (TTIs) for carrying at least one of uplink data or downlink data.

38. The subordinate entity of claim 36, wherein the plurality of subframes are each defined by a plurality of transmission time intervals (TTIs) each comprising a block of data and corresponding to a collection of symbols.

39. The subordinate entity of claim 36, wherein the subframe is defined by a plurality of transmission time intervals (TTIs) and each TTI comprises information configured to be independently decoded relative to other TTIs.

40. The subordinate entity of claim 36, wherein the subframe is defined by a plurality of transmission time intervals (TTIs) that are configurable to carry at least one of downlink data or uplink data.

41. A method of wireless communication for a subordinate entity to communicate with a scheduling entity utilizing a time division duplex (TDD) carrier via a plurality of subframes, the method comprising:
utilizing a subframe structure for at least a set of a plurality of subframes, each of the plurality of subframes in the set having a same duration, the subframe structure comprising a control portion, a data portion, and an acknowledgement portion;
receiving scheduling information in the control portion of a subframe of the plurality of subframes;
transmitting data information corresponding to the scheduling information in the data portion of the subframe that is associated with a set of subordinate entities; and
receiving acknowledgement information corresponding to the data information in the acknowledgement portion of the subframe, wherein the control portion, the data portion, and the acknowledgement portion are contained in the same subframe.

42. The method of claim 41, wherein the plurality of subframes are each defined by a plurality of transmission time intervals (TTIs) for carrying at least one of uplink data or downlink data.

43. The method of claim 41, wherein the plurality of subframes are each defined by a plurality of transmission time intervals (TTIs) each comprising a block of data and corresponding to a collection of symbols.

44. The method of claim 41, wherein the subframe is defined by a plurality of transmission time intervals (TTIs) and each TTI comprises information configured to be independently decoded relative to other TTIs.

45. The method of claim 41, wherein the subframe is defined by a plurality of transmission time intervals (TTIs) that are configurable to carry at least one of downlink data or uplink data.

46. A subordinate entity configured to wireles sly communicate with a scheduling entity in a wireless network, comprising:
a processor;
a wireless transceiver communicatively coupled to the processor; and
a memory communicatively coupled to the processor, wherein the processor is configured to:
utilize a subframe structure for at least a set of a plurality of subframes within a time division duplex (TDD) carrier, each of the plurality of subframes in the set having a same duration, the subframe structure comprising a control portion, a data portion, and an acknowledgement portion;
receive scheduling information in the control portion of a subframe of the plurality of subframes;
transmit data information corresponding to the scheduling information in the data portion of the subframe that is associated with a set of subordinate entities; and
receive acknowledgement information corresponding to the data information in the acknowledgement portion of the subframe, wherein the control portion, the data portion, and the acknowledgement portion are contained in the same subframe.

47. The subordinate entity of claim 46, wherein the plurality of subframes are each defined by a plurality of transmission time intervals (TTIs) for carrying at least one of uplink data or downlink data.

48. The subordinate entity of claim 46, wherein the plurality of subframes are each defined by a plurality of transmission time intervals (TTIs) each comprising a block of data and corresponding to a collection of symbols.

49. The subordinate entity of claim 46, wherein the subframe is defined by a plurality of transmission time intervals (TTIs) and each TTI comprises information configured to be independently decoded relative to other TTIs.

50. The subordinate entity of claim 46, wherein the subframe is defined by a plurality of transmission time intervals (TTIs) that are configurable to carry at least one of downlink data or uplink data.

* * * * *